(12) United States Patent
Sandsten et al.

(10) Patent No.: US 12,105,020 B2
(45) Date of Patent: Oct. 1, 2024

(54) GAS LENS FILTER SYSTEMS AND METHODS

(71) Applicant: FLIR Systems AB, Täby (SE)

(72) Inventors: Jonas Sandsten, Lomma (SE); Sten Lindau, Täby (SE)

(73) Assignee: FLIR Systems AB, Täby (SE)

( * ) Notice: Subject to any disclaimer, the term of this patent is extended or adjusted under 35 U.S.C. 154(b) by 570 days.

(21) Appl. No.: 17/351,126

(22) Filed: Jun. 17, 2021

(65) Prior Publication Data

US 2021/0310941 A1  Oct. 7, 2021

Related U.S. Application Data

(63) Continuation of application No. PCT/US2019/063097, filed on Nov. 25, 2019.

(60) Provisional application No. 62/783,086, filed on Dec. 20, 2018.

(51) Int. Cl.
*G01N 21/3518* (2014.01)
*G02B 5/28* (2006.01)
*G02B 13/14* (2006.01)

(52) U.S. Cl.
CPC ......... *G01N 21/3518* (2013.01); *G02B 5/281* (2013.01); *G02B 13/14* (2013.01); *G01N 2201/0648* (2013.01); *G01N 2201/0686* (2013.01)

(58) Field of Classification Search
None
See application file for complete search history.

(56) References Cited

U.S. PATENT DOCUMENTS

| | | | |
|---|---|---|---|
| 10,422,741 B2 | 9/2019 | Sandsten et al. | |
| 2011/0279681 A1 | 11/2011 | Cabib et al. | |
| 2014/0091419 A1 | 4/2014 | Hasegawa et al. | |
| 2017/0363541 A1* | 12/2017 | Sandsten | G01N 21/3504 |

FOREIGN PATENT DOCUMENTS

| | | |
|---|---|---|
| CN | 103608705 A | 2/2014 |
| CN | 107407634 A | 11/2017 |
| CN | 107532999 A | 1/2018 |
| EP | 2871452 | 5/2015 |
| JP | 2012002735 | 1/2012 |
| WO | WO 2018/183973 | 10/2018 |

* cited by examiner

*Primary Examiner* — David P Porta
*Assistant Examiner* — Meenakshi S Sahu
(74) *Attorney, Agent, or Firm* — .Haynes and Boone, LLP

(57) ABSTRACT

Provided are systems and methods to filter infrared spectrum radiation that can be integrated with a compact optical system for an infrared imaging system. The optical system includes an objective lens element configured to receive and transmit infrared (IR) radiation from a scene, where the IR radiation from the scene includes a particular range of wavelengths corresponding to an absorption spectrum or a transmission spectrum of a gas. The optical system also includes a spectral lens element configured to receive the IR radiation transmitted through the objective lens element, where the spectral lens element comprises a first interference filter disposed on a first surface of the spectral lens element. The interference filter is configured to filter the IR radiation transmitted through the objective lens element to a narrower wavelength band that includes the particular range of wavelengths.

20 Claims, 21 Drawing Sheets

GAS LENS FILTER SYSTEMS AND METHODS

CROSS-REFERENCE TO RELATED APPLICATIONS

This application is a continuation of International Patent Application No. PCT/US2019/063097 filed Nov. 25, 2019 and entitled "GAS LENS FILTER SYSTEMS AND METHODS," which claims priority to and the benefit of U.S. Provisional Patent Application No. 62/783,086 filed Dec. 20, 2018 and entitled "GAS LENS FILTER SYSTEMS AND METHODS," which are hereby incorporated by reference in their entirety.

International Patent Application No. PCT/US2019/063097 filed Nov. 25, 2019 is related to U.S. patent application Ser. No. 15/692,805 filed Aug. 31, 2017 and entitled "WAVELENGTH BAND BASED PASSIVE INFRARED GAS IMAGING," which is incorporated herein by reference in its entirety.

U.S. patent application Ser. No. 15/692,805 is a continuation of International Patent Application No. PCT/EP2016/054449 filed Mar. 2, 2016 and entitled "WAVELENGTH BAND BASED PASSIVE INFRARED GAS IMAGING," which is incorporated herein by reference in its entirety.

International Patent Application No. PCT/EP2016/054449 Filed Mar. 2, 2016 claims priority to and the benefit of U.S. Provisional Patent Application No. 62/127,247 filed Mar. 2, 2015 and entitled "WAVELENGTH BAND BASED PASSIVE INFRARED GAS IMAGING," which is hereby incorporated by reference in its entirety.

TECHNICAL FIELD

The present disclosure relates generally to imaging and visualizing gas and, in particular, to imaging and visualizing gas using infrared imaging systems and methods.

BACKGROUND

Thermal, or infrared (IR), images of scenes are often useful for monitoring, inspection and/or maintenance purposes, e.g. for monitoring gas leaks at an industrial plant. Typically, a thermal imaging device, e.g. in the form of a thermography arrangement or an infrared IR camera, is provided to capture infrared (IR) image data values, representing infrared radiation emitted from an observed scene. The captured IR image can after capturing be processed, displayed and/or saved, for example in the thermal imaging device or in a computing device connected to the thermal imaging device such as a tablet computer, a smartphone, a laptop or a desktop computer.

Thermal imaging devices, such as IR cameras, might be used for detecting gas occurrence, for example in the form of a gas cloud or gas plume e.g. from fugitive gas emissions or gas leaks, and for producing a visual representation of such gas occurrence as a gas infrared image. Such a gas infrared image can be used for visualizing gas occurrence or gas leaks, e.g. as smoke or a cloud on images presented on the viewfinder of a camera, on an integrated or separate display, or on an external computing device, thereby allowing the user to see gas occurrence in a scene observed and imaged by means of an IR camera. A variant of such techniques is called passive infrared gas imaging and is based on using radiation from a scene without any additional illumination for detecting gas.

However, a problem with conventional systems is that the sensitivity of the thermal imaging device might be too low to detect gas below a certain gas particle concentration or, in other words, the contrast between gas information and noise/interference in a generated gas infrared image is too low to identify gas. Another problem is that the sensitivity is further reduced by various physical aspects, such as varying temperatures and emissivity in the observed scene background, noise, other gases, aerosol particles and moving gas clouds.

In conventional technology, particularly using cooled thermal imaging devices, gas imaging may be based on the difference in absorption or transmission of infrared radiation in different wavelength bands. A problem, particularly with uncooled thermal imaging devices, is that when basing gas imaging on the difference in absorption or transmission of infrared radiation in selected wavelength bands, the bands cannot be made narrow due to high noise contribution by imaging device components such as filters, optical systems, wave guide and the detector itself. This means that physical characteristics of the system, such as noise or thermal interference might vary significantly with wavelength and will be more difficult to compensate for.

There is a need to address the problems of conventional systems to improve gas detection sensitivity in gas imaging with reduced complexity, size, weight, manufacturing cost and/or overall power consumption for imaging for example a wide range of gases without hardware reconfigurations that result in high cost and weight increase.

SUMMARY

Various techniques and embodiments of methods, systems and computer program products are disclosed for imaging gas in a scene having a background and a possible occurrence of gas. In various embodiments gas imaging is carried out by controlling a thermal imaging system to capture a gas IR image representing the temperature of a gas and a background IR image representing the temperature of a background based on a predetermined absorption spectrum of the gas, on an estimated gas temperature and on an estimated background temperature. A gas-absorption-path-length image, representing the length of the path of radiation from the background through the gas, is then generated based on the gas image and the background IR image.

In further variants, in accordance with one or more embodiments, the methods, systems and computer program products further comprise a selection of:

Generating a gas visualization image based on the gas-absorption-path-length image.

Controlling, for the capturing of the gas IR image, the thermal imaging system to capture radiation in a high absorption wavelength band A determined to include wavelengths with high absorption of radiation for the gas in the predetermined absorption spectrum; and/or controlling, for the capturing of the background IR image, the thermal imaging system to capture radiation in a low absorption wavelength band B determined to include wavelengths with low absorption of radiation for the gas in the predetermined absorption spectrum.

Determining the high absorption wavelength band A to include an absorption wavelength band G from the absorption spectrum of the gas:

and/or determining the low absorption wavelength band B to at least partially overlap the high absorption wavelength band A.

Estimating the gas temperature $T_G$ based on a measured ambient air temperature retrieved from an ambient air temperature sensor;
and/or
estimating the gas temperature $T_G$ based on a previously captured gas IR image.
Estimating the background temperature $T_B$ based on a previously captured background IR image.
Generating a gas-absorption-path-length image further based on a gas to background difference relation.
Determining the high absorption wavelength band A further comprising:
   determining an absorption wavelength band G based on the absorption spectrum of the gas, wherein the absorption wavelength band G is determined to include at least a local minimum of the absorption spectrum: and
   determining the high absorption wavelength band A as including the absorption wavelength band G and possibly a predetermined wavelength margin.
The predetermined wavelength margin being a selection of:
   a first wavelength margin G_MARGIN1 applied to the lower endpoint of the absorption wavelength band G;
   and/or
   a second wavelength margin G_MARGIN2 applied to the higher endpoint of the absorption wavelength band G.
Determining the low absorption wavelength band B further comprising:
   determining the low absorption wavelength band B as having a width greater than the high absorption wavelength band A, possibly within a predetermined wavelength margin.
The predetermined wavelength margin being a selection of:
a first wavelength margin A_MARGIN1 below the lower endpoint of high absorption wavelength band A:
and/or
a second wavelength margin A_MARGIN2 above the higher endpoint of high absorption wavelength band A.
Determining the low absorption wavelength band B further comprising:
obtaining an objective function indicative of contrast and dependent on pixel values of the gas-absorption-path-length image:
generating an optimized wavelength band B by evaluating the objective function on wavelength band B shifted within a band constraint and by selecting a shifted wavelength band B with an evaluated objective function value representing a local minimum as the optimized wavelength band B.
Determining the low absorption wavelength band B comprising the excluding of the absorption wavelength band G from the low absorption wavelength band B.
Generating a visual presentation image based on pixel values of the gas-absorption-path-length image and a palette, wherein said palette comprises grayscales and/or colors associated to mutually exclusive ranges of pixel values.
Determining a water wavelength band C to improve contrast in a generated gas-absorption-path-length image based on a predetermined water absorption spectrum, wherein the water wavelength band C includes at least a local minimum of the water absorption spectrum and preferably excludes the high absorption wavelength band A and/or the low absorption wavelength band B:
controlling, for capturing a water image, the thermal imaging system to capture radiation within the water wavelength band C;
generating the gas-absorption-path-length image further based on the water image.
A thermal imaging device for imaging gas comprising a thermal imaging system and a processor, being adapted to perform any of the steps and functions of the embodiments described herein.
A computer-readable medium for imaging gas, comprising stored thereon: non-transitory information for performing any of the embodiments described herein; and/or non-transitory information configured to control a processor/processing unit to perform any of the steps or functions described herein.
A computer program product for imaging gas, comprising code portions adapted to control a processor to perform any of the steps or functions of any of embodiments described herein.

In one embodiment, an optical system includes an objective lens element configured to receive and transmit infrared (IR) radiation from a scene, where the IR radiation from the scene includes a particular range of wavelengths corresponding to an absorption/emission spectrum, or transmission spectrum of a gas. The optical system also includes a spectral lens element configured to receive the IR radiation transmitted through the objective lens element, where the spectral lens element comprises a first interference filter disposed (deposited or otherwise formed) on a first surface of the spectral lens element. The interference filter is configured to filter the IR radiation transmitted through the objective lens element to a narrower wavelength band that includes the particular range of wavelengths.

In another embodiment, a method includes providing the IR radiation in the narrower wavelength band to a detector; capturing, by the detector, an IR image of the scene based on the IR radiation in the narrower wavelength band; processing, by a processor, image data corresponding to the captured IR image and provided by the detector; and displaying a gas-absorption-path-length image of the scene based on the processed image data.

In another embodiment, a method includes receiving and transmitting, by an objective lens element of an optical system for a device, infrared (IR) radiation from a scene, where the IR radiation from the scene includes a particular range of wavelengths corresponding to an absorption/emission spectrum or transmission spectrum of a gas; and receiving, by a spectral lens element of the optical system, the IR radiation transmitted through the objective lens element, where the spectral lens element includes a first interference filter disposed (deposited or otherwise formed) on a first surface of the spectral lens element that is configured to filter the IR radiation transmitted through the objective lens element to a narrower wavelength band that includes the particular range of wavelengths.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Introduction

The disclosure relates to imaging and visualizing gas or fugitive gas using infrared IR sensors or detectors and image processing. An example of a use case is the inspection with a thermal imaging device of a part of an industrial complex handling gas.

In particular the disclosure relates to passive gas imaging that uses thermal background radiation within the infrared region and can be used to image gas for example against a cold background, in this case imaging thermal emission or radiation from the gas, or used against a warm background, in that case imaging absorption by the gas of thermal radiation from the background. Imaging of gas is based on the difference in gas temperature $T_G$ and background temperature $T_B$, hereinafter referred to as gas to background temperature difference ΔT. However, the sensitivity of a thermal imaging system is dependent on the difference in gas temperature $T_G$ and background temperature $T_B$.

Figure 1:
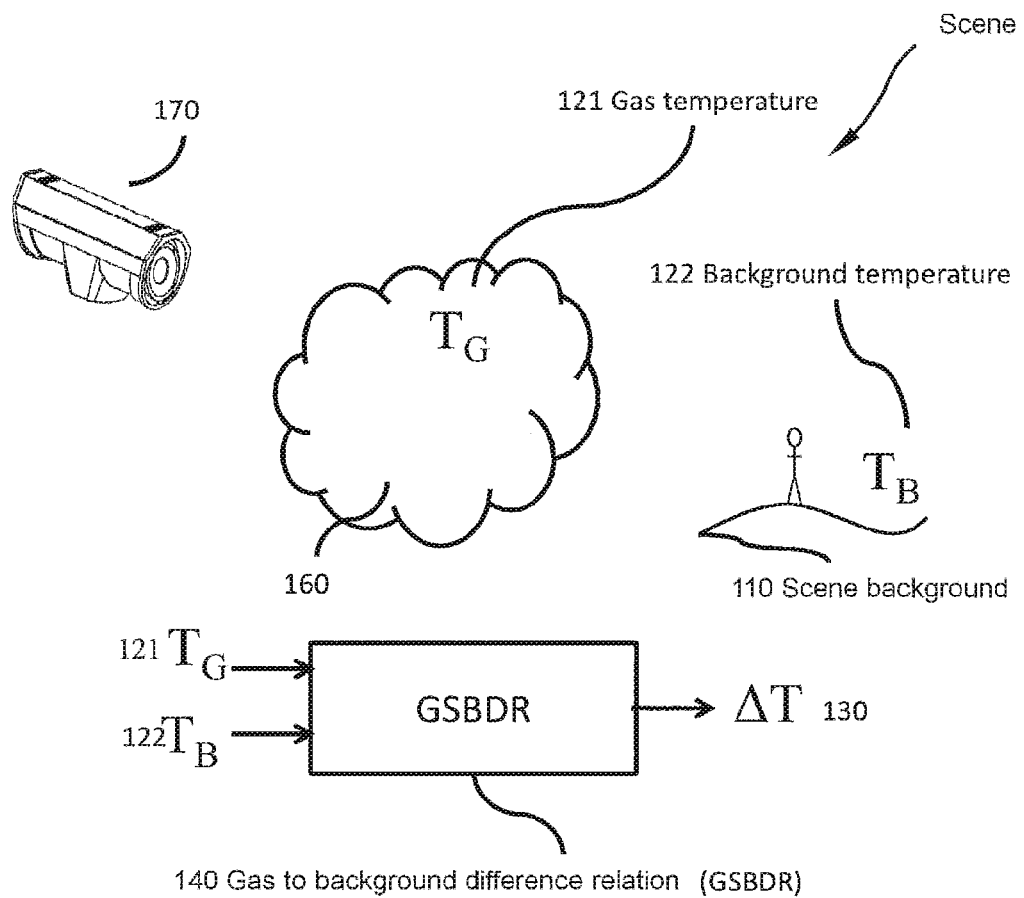
FIG. 1 shows a schematic view of passive imaging of gas based on a background temperature difference ΔT, in accordance with of one or more embodiments of the disclosure.

FIG. 1 shows a schematic view of a method and an apparatus for passive imaging of gas based on background temperature difference ΔT 130, in accordance with one or more embodiments. A thermal imaging device 170 is adapted to capture radiation within controllable wavelength bands and thus to produce infrared images, herein also called IR images or thermal images, representing a particular selected wavelength band of infrared radiation from a scene. Between the thermal imaging device 170 (also referred to as a thermal imaging system) and a scene background 110 there is gas 160 present in the form of aerosol particles or gas molecules, in the figures illustrated as a gas occurrence in the shape of a gas cloud. The scene background 110 has a background temperature $T_B$ 122, and the gas has a gas temperature $T_G$ 121. A temperature difference parameter preferably in the form of a gas to background temperature difference ΔT 130 can be determined or calculated based on the background temperature $T_B$ 122 and the gas temperature $T_G$ 121 by a gas to background difference relation 140. In a accordance with one or more embodiments, a thermal imaging device 170 is configured and/or controlled to capture and/or generate a selection of inter alia a background IR image representing the thermal radiation from the background in a scene, a gas IR image representing a gas occurrence between the thermal imaging device and a background in a scene and/or a possible other IR image representing other phenomena in the scene.

In one or more embodiments, a gas-absorption-path-length image representing the length of the path of radiation from the scene background 110 through a gas occurrence in the scene can be generated based on a gas image, a background image and optionally the temperature difference parameter ΔT 130. In yet an embodiment, gas is visualized in a gas visualization image presentable or presented to the user on a display, this image being based on pixel values of the gas-absorption-path-length image. In yet an embodiment a background temperature $T_B$ 122 derived from a pixel value in a background image and a gas temperature $T_G$ 121 derived from a pixel value in a gas image are used to determine the temperature difference parameter ΔT 130.

In one or more embodiments, the gas temperature $T_G$ is estimated based on a measured ambient air temperature retrieved from an ambient air temperature sensor and/or based on a previously captured gas IR image that comprises a representation of the intensity of infrared radiation within a first wavelength band A substantially including wavelengths of infrared radiation with high absorptance values for the gas in an absorption spectrum and/or low transmittance values in a transmission spectrum. In other words, the first wavelength band A is a high absorption wavelength band that includes wavelengths significantly affected by the presence of the gas to be imaged. In a case where the gas has a temperature higher than the ambient air temperature or the background temperature there is radiation from the gas in an emission spectrum. The first wavelength band A is herein also called high absorption wavelength band A.

In one or more embodiments, the background temperature $T_B$ is estimated based on a previously captured background IR image that comprises a representation of the intensity of infrared radiation within a second wavelength band B substantially including wavelengths of infrared radiation with low absorptance values for the gas in an absorption spectrum and/or high transmittance values in a transmission spectrum. In other words, the second wavelength band B is a low absorption wavelength band and/or a high transmission wavelength band that includes wavelengths insignificantly affected by the presence of the gas to be detected. The second wavelength band B is herein also called low absorption wavelength band B.

Figure 2A:
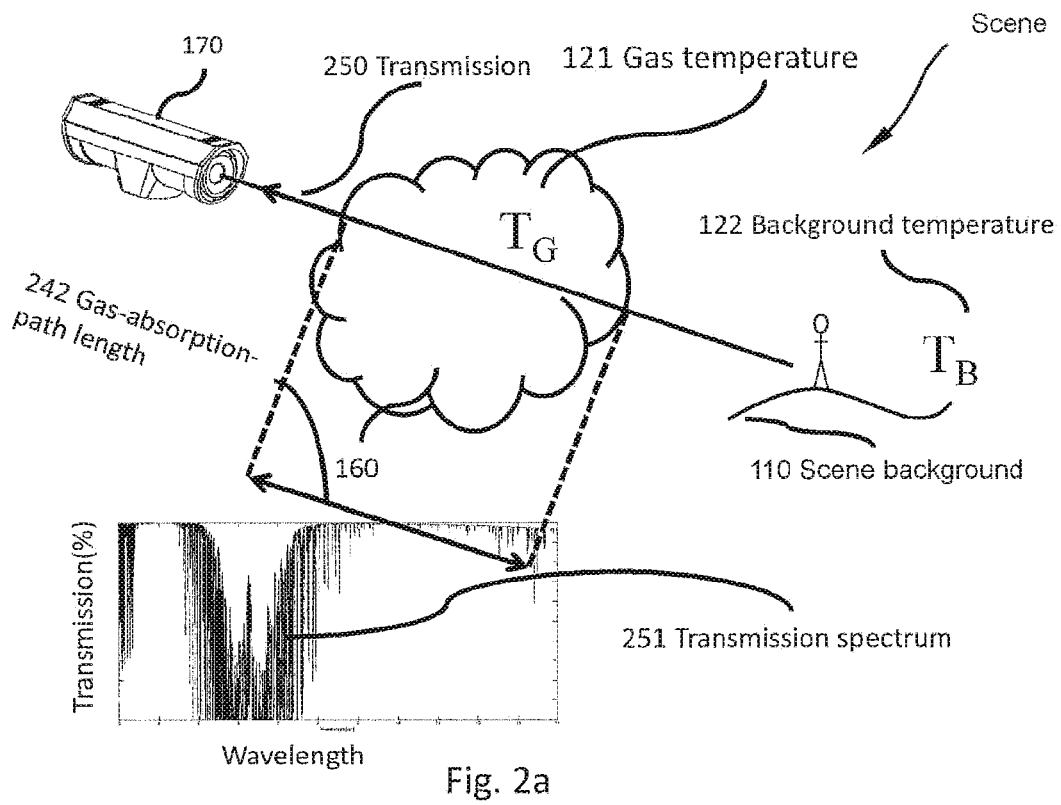
FIG. 2a illustrates a method for imaging gas, in accordance with one or more embodiments of the disclosure.

FIG. 2a illustrates a method for imaging gas in accordance with one or more embodiments for example applicable in a situation where the background temperature $T_B$ 122 is higher than the gas temperature $T_G$ 121, i.e. the scene background is warmer than the gas 160. A fraction of the energy or infrared radiation emitted from the scene background 110 is transmitted through the gas 160, indicated as radiation transmission 250 with a gas-absorption-path length 242, to the detector in a thermal imaging device 170. In one or more embodiments this fraction can be determined by using a predetermined relation for example based on a transmission spectrum 251.

Figure 2B:
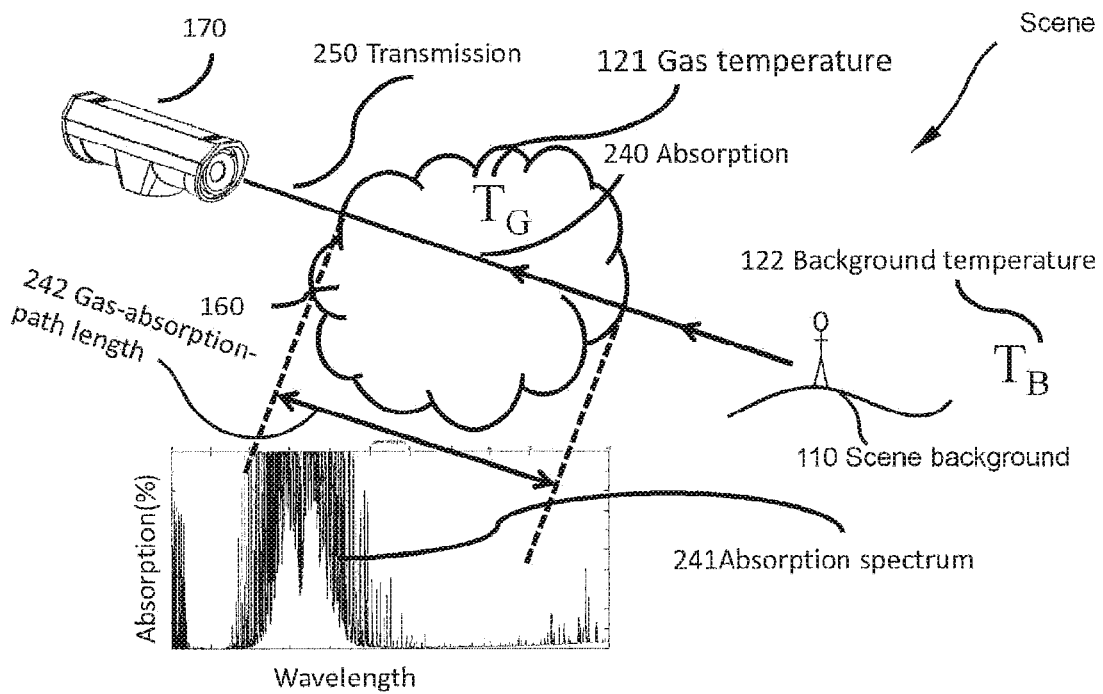
FIG. 2b illustrates a further method for imaging gas, in accordance with one or more embodiments of the disclosure.

FIG. 2b illustrates a method for imaging gas in accordance with one or more embodiments for example applicable in a situation where the background temperature $T_B$ 122 is lower than the gas temperature $T_G$ 121, i.e. the scene background is colder than the gas. A fraction of the energy or infrared radiation emitted from the scene background 110 is transmitted through the gas, indicated as radiation transmission 250 with a gas-absorption-path length 242, to the detector in a thermal imaging device 170. In one or more embodiments this transmitted fraction can be determined by using a predetermined relation for example based on an absorption spectrum 241.

By controlling the thermal imaging system to capture radiation in a high absorption wavelength band A including wavelengths significantly affected by the presence of the gas to be detected, and to capture radiation in a low absorption wavelength band B including wavelengths insignificantly affected by the presence of the gas to be detected, a background IR image and a gas IR image are generated. Based on the background IR image, on the gas IR image and dependent on a transmission spectrum 251 and/or on an absorption spectrum 241, a gas-absorption-path-length image with improved contrast is generated in a system with improved sensitivity and/or improved signal to noise ration.

Figure 3:
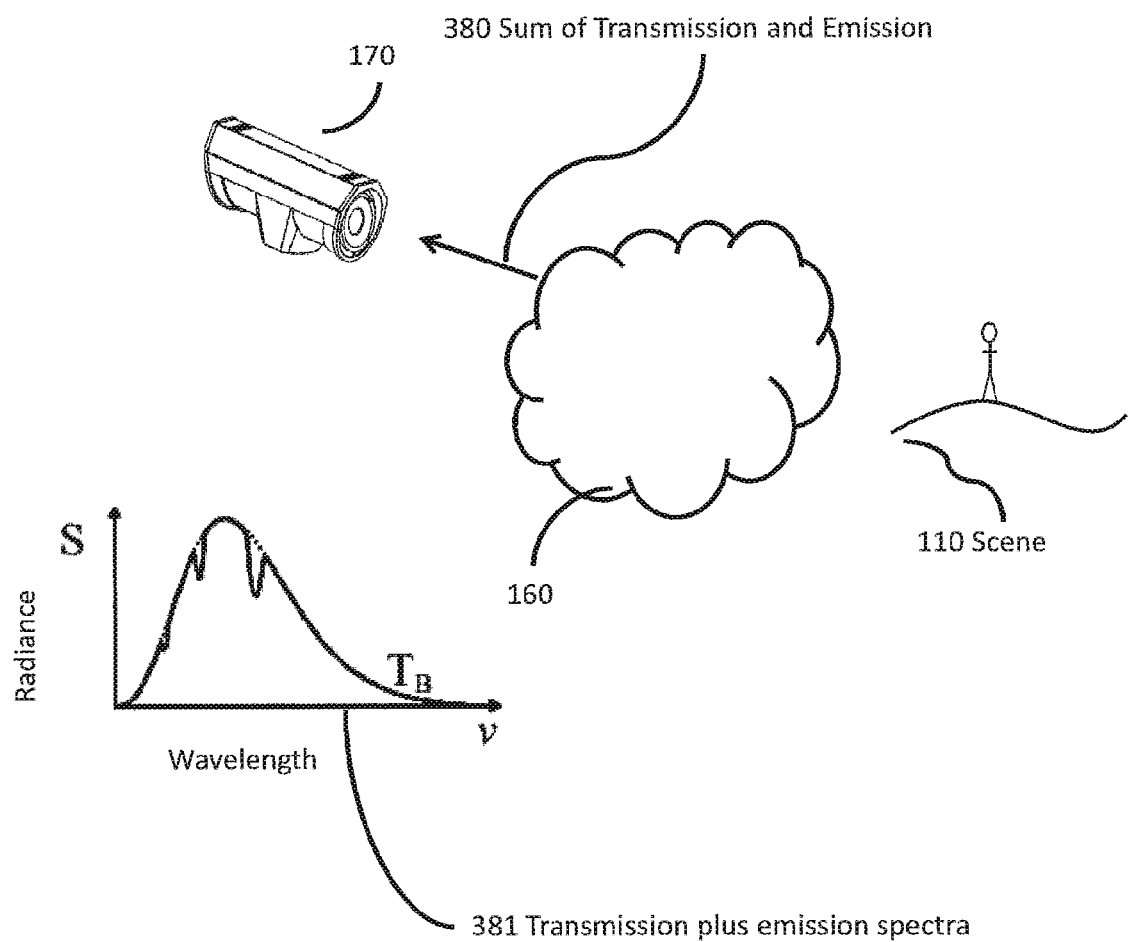
FIG. 3 illustrates a method for imaging gas in a case when the background temperature $T_B$ is lower than the gas temperature $T_G$, in accordance with one or more embodiments of the disclosure.

FIG. 3 illustrates one or more embodiments applied in a situation where the background temperature $T_B$ is lower than the gas temperature $T_G$, i.e. the background is colder than the gas 160. The thermal imaging system 170 is controlled to capture radiation in a low absorption wavelength band B including wavelengths less affected or not so affected, i.e. insignificantly affected by the presence of the gas to be detected, and to capture radiation in a high absorption wavelength band A including wavelengths more affected, i.e. significantly affected by the presence of the gas to be detected. There is also radiation emitted from the gas 160 in wavelengths in an emission spectrum. The thermal imaging system is controlled to capture radiation comprising a sum 380 of transmission through the gas and emission from the gas 160. A gas-absorption-path-length image is generated based on a transmission plus emission spectrum 381 being a sum of a transmission spectrum and an emission spectrum.

Figure 4:
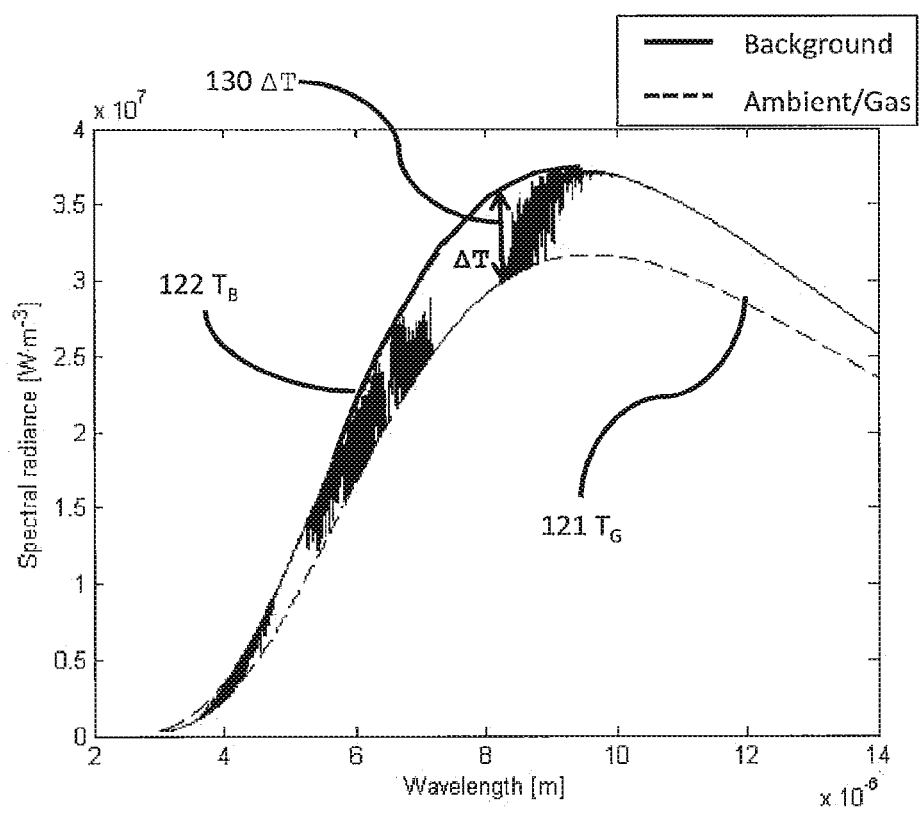
FIG. 4 illustrates in a graph an example on how gas temperature $T_G$, background temperature $T_B$ and gas to background temperature difference ΔT varies with the wavelength of the infrared radiation from a scene having a gas occurrence.

FIG. 4 is a graph showing radiance from a scene in relation to wavelength in the infrared range, the scene comprising a background and a gas occurrence in the ambient atmosphere in the scene. Translated to temperature corresponding to the radiance related to wavelength, this graph shows an example on how the gas temperature $T_G$ indicated with an intermittently drawn line, the background temperature $T_B$ indicated with a fully drawn line and the gas to background temperature difference ΔT 130, i.e. the difference $T_B$-$T_G$, varies with the wavelength of the infrared radiation from the scene.

Figure 5:
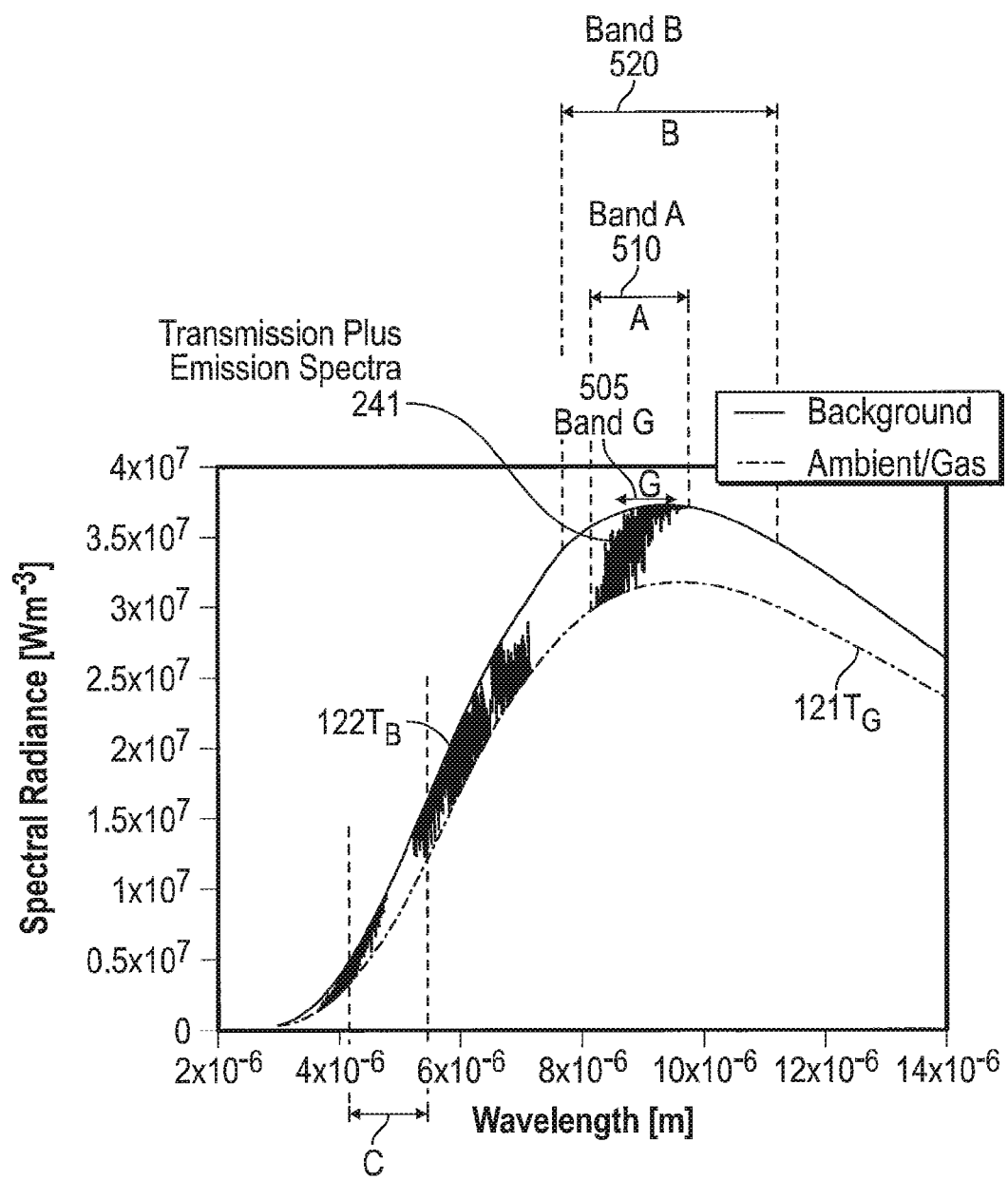
FIG. 5 illustrates in a graph an example of a wavelength band A 510 and a wavelength band B 520 determined to improve contrast in a generated gas-absorption-path-length image, in accordance with one or more embodiments of the disclosure.

FIG. 5 illustrates by means of a temperature/wavelength relation similar to that of FIG. 4 an example of one or more embodiments wherein a high absorption wavelength band A 510 and a low absorption wavelength band B 520 have been determined for the purpose to improve contrast in a generated gas-absorption-path-length image based on a predetermined absorption spectrum 241 of the gas, an estimated gas temperature $T_G$ 121 and an estimated background temperature $T_B$ 122. Wavelength band B 520 is selected to include wavelengths less affected or not so affected, i.e. insignificantly affected by the presence of the gas to be detected. Wavelength band A 510 is selected to include wavelengths more or strongly affected, i.e. significantly selected by the presence of the gas to be detected. In one or more embodiments, wavelength band A 510 includes an absorption wavelength band G 505 from the absorption spectrum 241 (FIG. 2b), i.e. a subset of the absorption spectrum significantly affected by the presence of the gas to be imaged, or expressed in a different aspect as a subset of a transmission spectrum less affected by the presence of the gas to be imaged. Furthermore, the low absorption wavelength band B 520 at least partially overlaps wavelength band A 510, thereby minimizing variations between wavelength band A 510 and wavelength band B 520 in emission/emissivity represented by values in the emission spectrum. Thereby an improved sensitivity and an improved signal to noise ratio is achieved in the thermal imaging system resulting in improved contrast in a generated gas-absorption-path-length image. Another effect by one or more embodiments is an elimination or simplification of the complexity of compensating for varying emission/emissivity in a scene.

System Embodiments

Figure 6:
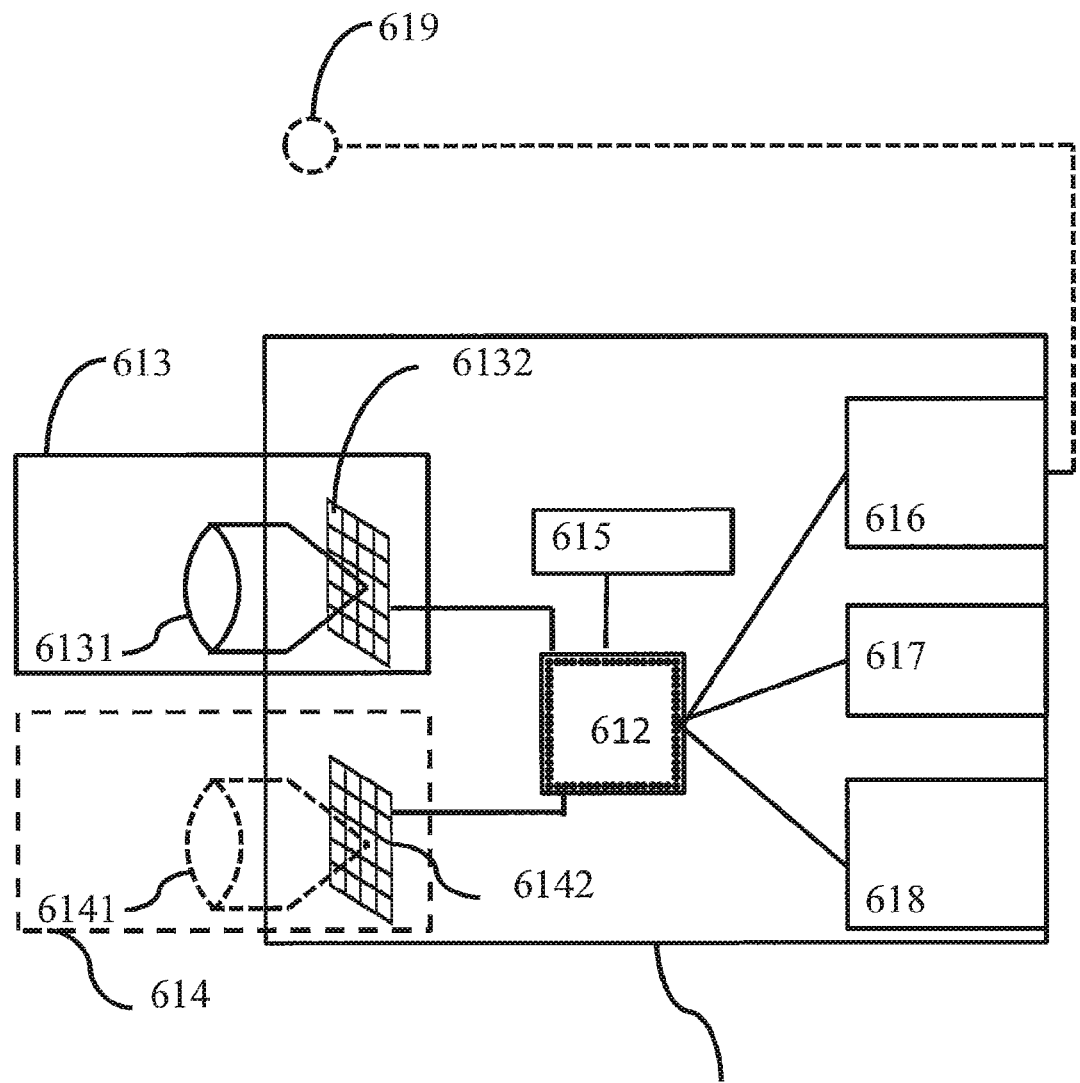
FIG. 6 shows a schematic view of a thermal imaging device, in accordance with one or more embodiments of the disclosure.

FIG. 6 shows a schematic view of one or more embodiments of a thermal imaging device or system 170, e.g. in the form of a thermography arrangement or an infrared IR camera. The thermal imaging device 170 comprises a first infrared (IR) imaging system 613 that is configured and/or controllable to capture infrared (IR) images in the form of IR image data values/pixel values, representing infrared radiation emitted from an observed scene within one or more selectable wavelength bands A, B or C. The infrared (IR) imaging system 613 is further communicatively coupled to a processor 612.

The first infrared (IR) imaging system 613 is further configured to receive control data and to trigger the capturing of an IR image of a scene within a selected wavelength band in response to said control data. The first infrared (IR) imaging system 613 is further arranged to send a signal frame or data frame of IR image data values representing a captured image to the processor 612. IR image data typically include data values for example represented in an instance of a data structure, such as an image data frame as mentioned. The processor/processing unit 612 is provided with specifically designed programming or program code portions adapted to control the processing unit to perform the steps and functions of one or more embodiments of the method and/or methods described herein.

The thermal imaging device 170 further comprises at least one memory 615 configured to store data values or parameters received from a processor 612 or to retrieve and send data values or parameters to a processor 612. A communications interface 616 is configured to send or receive data values or parameters to or from a processor 612 to or from external or internal units or sensors via the communications interface 616. An optional input device 617 is configured to receive an input or an indication from a user, e.g. an input of a user indicating a command to execute the imaging of a gas-absorption-path-length image.

In one or more embodiments, the thermal imaging device 170 further comprises a display 618 configured to receive a signal from a processor 612 and to display the received signal as a displayed image, e.g. to display a visual representation of a gas-absorption-path-length image to a user of the thermal imaging device 170. In one or more embodiments, the display 618 is integrated with a user input device 617 configured to receive a signal from a processor 612 and to display the received signal as a displayed image and receive input or indications from a user, e.g. by comprising touch screen functionality and to send a user input signal to said processor/processing unit 612.

In one or more embodiments, the thermal imaging device 170 further comprises an ambient air temperature sensor 619 configured to measure ambient air temperature and generate an ambient air temperature data value and provide the ambient air temperature data value to the processor 612 receiving, polling or retrieving the ambient air temperature data value. In one or more embodiments, the ambient air temperature sensor 619 is communicatively coupled to the processor 612 directly or via the communications interface 616, and may be provided as an external or an internal unit.

In one or more embodiments, the thermal imaging device 170 further optionally comprises a second infrared (IR) imaging system 614, preferably with properties and functions similar to those of the first infrared (IR) imaging system 612 described above. The second infrared (IR) imaging system 614 is similarly configured and/or controllable to capture infrared (IR) images in the form of IR image data values/pixel values, representing infrared radiation emitted from an observed scene within one or more selectable wavelength bands A, B or C. The second infrared (IR) imaging system 614 is further communicatively coupled to a processor 612, and is further configured to receive control data and to trigger the capturing of an IR image of a scene within a selected wavelength band in response to said control data. The second infrared (IR) imaging system 614 is further arranged to send a signal frame of IR image data values representing an infrared (IR) image to the processor 612.

Typically, the described infrared (IR) imaging systems 613, 614 each comprises an infrared (IR) optical system 6131, 6141, e.g. comprising a lens, possible zoom functionality and focus functionality 6131, together with a corresponding infrared (IR) sensor 6132, 6142, for example comprising a micro-bolometer focal plane array. Embodiments of the optical system 6131, 6141 are described further below.

Examples of Controllable/Selectable Wavelength Bands

The described infrared (IR) imaging systems 613, 614 are configured and/or controllable to capture infrared (IR) images in the form of IR image data values/pixel values, representing infrared radiation emitted from an observed scene within a preferably continuous subset of a plurality of wavelength bands A, B or C. One or more of the wavelength bands may be at least partly overlapping.

In one example, wavelength band A is selected as 7-9 μm and wavelength band B is selected as 9-15 μm, where the first infrared (IR) imaging system 613 is configured to capture gas IR images in the form of IR image data values/pixel values, representing infrared radiation emitted from an observed scene within 7-8.6 μm, and where the second infrared (IR) imaging system 614 is configured to capture background IR images in the form of IR image data values/pixel values, representing infrared radiation emitted from an observed scene within 9-12 μm.

Further Examples of Wavelength Bands

Table 1 shows examples of ranges of wavelength bands for different gases that may be used in embodiments described herein. So for example and as shown in the table, embodiments of a method or a device as described herein may be devised for operating on $CO_2$ and would in this example have a high absorption wavelength band A in the range of 4.2 μm-4.6 μm and a low absorption filter B in the range of 4.4 μm-4.6 μm.

TABLE 1

Examples of wavelength bands for different gases

| Gas | High absorption Wavelength band A | Low absorption Wavelength band B |
|---|---|---|
| Methane 1 | 3.2 μm-3.6 μm | 3.4 μm-3.6 μm |
| Methane 2 | 7.0 μm-9.0 μm | 8.5 μm-9.0 μm |
| $CO_2$ | 4.2 μm-4.6 μm | 4.4 μm-4.6 μm |
| $CO + N_2O$ | 4.52 μm-4.87 μm | 4.67 μm-4.87 μm |
| Refrigerants | 8.0 μm-9.0 μm | 8.6 μm-9.0 μm |
| $SF_6$ | 10.3 μm-11.1 μm | 10.7 μm-11.1 μm |

Spatial Sensor Configuration

Figure 7A:
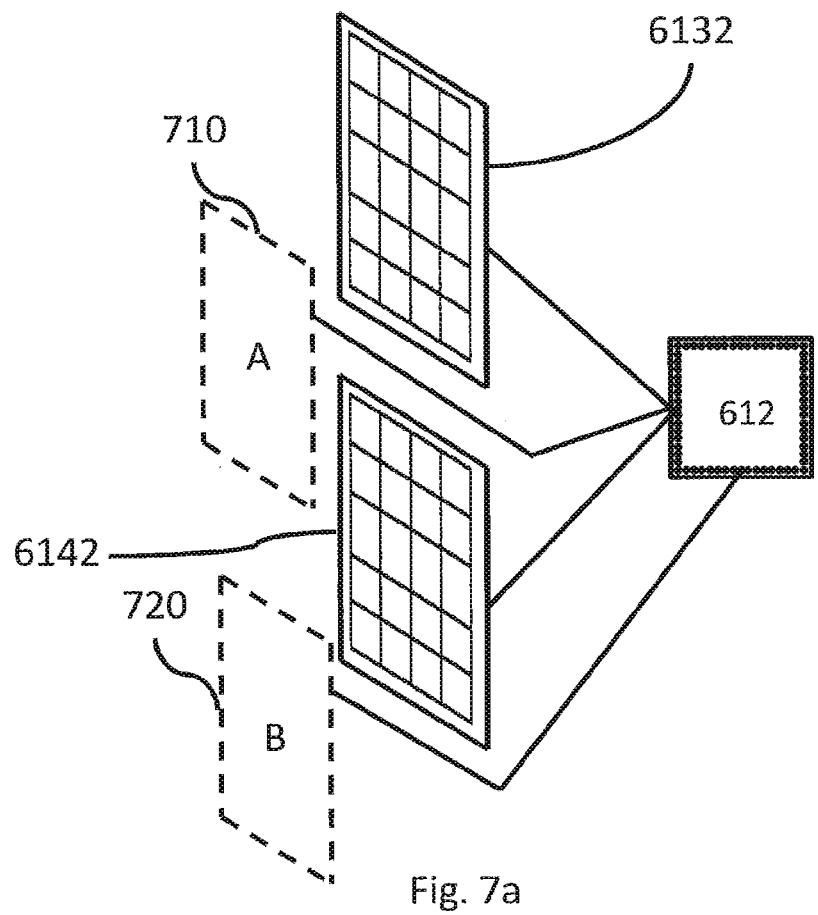
FIG. 7a shows a schematic view of a spatial sensor configuration in a thermal imaging device, in accordance with one or more embodiments of the disclosure.

FIG. 7a shows a schematic view of infrared sensors 6132, 6142 in a thermal imaging device 170 (cf. FIG. 6) configured to capture a gas IR image and a background IR image according to one or more embodiments. This can also be referred to as a spatial sensor configuration. A first infrared (IR) imaging system 613 (cf. FIG. 6), comprised in the thermal imaging device 170, comprises an image sensor 6132 configured to capture a gas IR image. The sensor 6132 is configured to capture infrared radiation within a high absorption wavelength band A. The first infrared (IR) imaging system 613 optionally comprises an optical gas filter 710 in the optical path of the sensor 6132 configured with a passband of infrared radiation within said high absorption wavelength band A. A second infrared (IR) imaging system 614 (cf. FIG. 6), comprised in the thermal imaging device 170, comprises an image sensor 6142 configured to capture a background IR image. The sensor 6142 is configured to capture infrared radiation within a low absorption wavelength band B. The second infrared (IR) imaging system 614 optionally comprises a background optical filter 720 in the optical path of the sensor 6142 configured with a passband of infrared radiation within said low absorption wavelength band B.

The sensor 6132, comprised in the first infrared (IR) imaging system 613, is configured to capture a gas IR image simultaneously, substantially simultaneously, or with a time interval, with the sensor 6142, comprised in the second infrared (IR) imaging system 613, capturing a background IR image. In one or more embodiments, the processor 612 is adapted to send control data to the first infrared (IR) imaging system to trigger the sensor 6132 to capture infrared radiation within the high absorption wavelength band A, and/or is adapted to send control data the second infrared (IR) imaging system to trigger the sensor 6142 to capture infrared radiation within the low absorption wavelength band B.

In one or more embodiments comprising one or more optical filters, the processor 612 is adapted to send control data to the first infrared (IR) imaging system to configure the gas optical filter 710 with a pass band equal to wavelength band A and adapted to send control data to the second infrared (IR) imaging system to configure the background optical filter 720 with a pass band equal to wavelength band B. A combination of controllable sensor and controllable optical filter are provided in one or more embodiments.

Temporal Sensor Configuration

Figure 7B:
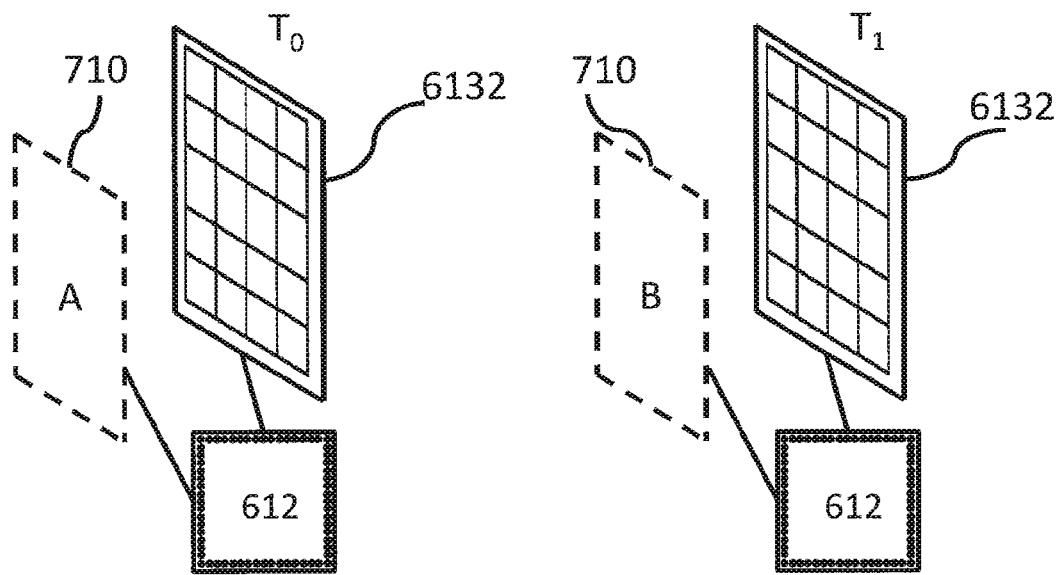
FIG. 7b shows a schematic view of a temporal sensor configuration in a thermal imaging device, in accordance with one or more embodiments of the disclosure.

FIG. 7b shows a schematic view of an infrared sensor 6132, 6142 in a thermal imaging device 170 (cf. FIG. 6) configured to capture a gas IR image and a background IR image according to one or more embodiments. This can also be referred to as a temporal sensor configuration. A first infrared (IR) imaging system 613, comprised in the thermal imaging device 170, comprises an image sensor 6132 configured to capture a gas IR image at time $T_0$ and a background IR image at time $T_1$. In one or more embodiments, the sensor 6132 is at time $T_0$ configured to capture infrared radiation within a high absorption wavelength band A. The first infrared (IR) imaging system 613 optionally comprises an optical filter 710 in the optical path of the sensor 6132 configured at time $T_0$ with a passband of infrared radiation equal to a high absorption wavelength band A and configured at time $T_1$ with a passband of infrared radiation equal to a low absorption wavelength band B.

In one or more embodiments, the processor 612 is adapted to send control data to the first infrared (IR) imaging system to configure the captured wavelength band of the sensor 6132 to the high absorption wavelength band A and to trigger the capturing of a gas IR image at time $T_0$, and to configure the captured wavelength band of the sensor 6132 to the low absorption wavelength band B and to trigger the capturing of a gas IR image at time $T_1$. Typically, there is a short time lapse between the time $T_0$ and the time $T_1$, suitably selected to reconfigure the sensor for different wavelength bands.

In one or more embodiments comprising one or more optical filters, the processor 612 is adapted to send control data to the first infrared (IR) imaging system to configure the optical filter 710 with a pass band equal to the high absorption wavelength band A at time $T_0$ and to configure the optical filter 710 with a pass band equal to the low absorption wavelength band B at time $T_1$. A combination of controllable sensor and controllable optical filter are provided in one or more embodiments also in a temporal sensor configuration.

Intertwined Sensor Configuration

Figure 8A:
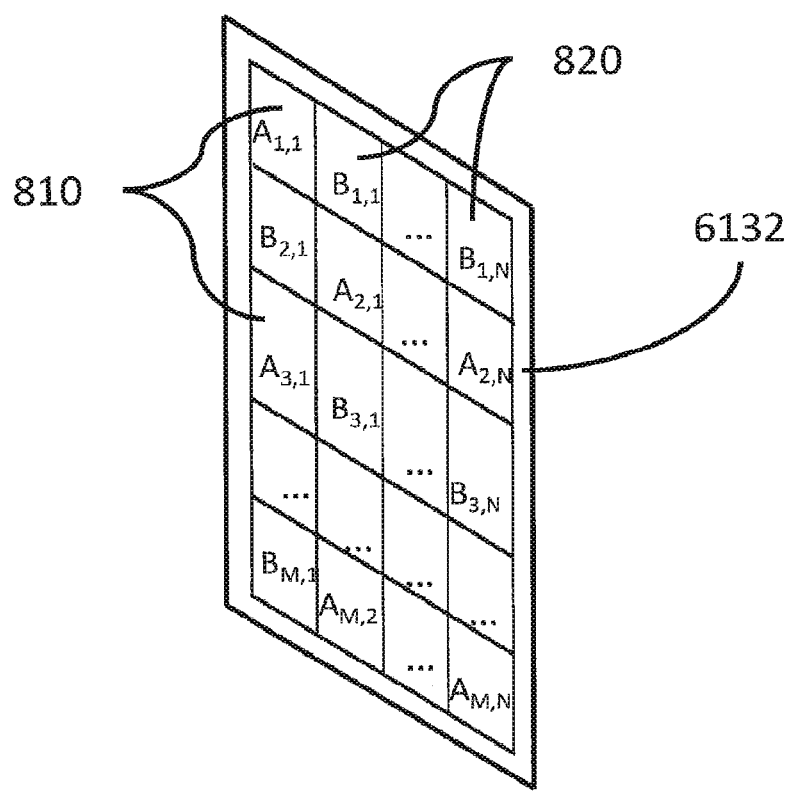
FIG. 8a shows a schematic view of an intertwined sensor configuration in a thermal imaging device, in accordance with one or more embodiments of the disclosure.

FIG. 8a shows a schematic view of an infrared sensor 6132 in a thermal imaging device configured to capture a gas IR image and a background IR image according to one or more embodiments. This can also be referred to as an intertwined sensor configuration and has the additional advantage of eliminating the need for aligning or registering the gas image and the background image.

A first infrared (IR) imaging system 613, comprised in the thermal imaging device 170 (cf. FIG. 6), comprises an image sensor 6132 configured with a first set of detector elements for capturing gas related radiation, here called a gas set of detector elements 810, and with a second set of detector elements for capturing background related radiation, here called a background set of detector elements 820. The first and the second sets of detector elements are intertwined such that detector elements 810 capturing infrared radiation within a high absorption wavelength band A alternate with detector elements 820 capturing infrared radiation within a low absorption wavelength band B in both rows and columns of the sensor 6132.

The processor 612 is adapted to send control data to configure the gas set detector elements 810 to capture infrared radiation within the high absorption wavelength band A, and to configure background set detector elements 820 to capture infrared radiation within wavelength band B. The processor 612 is further adapted to send control data to the first infrared (IR) imaging system to trigger the capturing of a gas IR image by the gas set detector elements 810 and to trigger the capturing of a background IR image by the background set detector elements 820.

Interlaced Sensor Configuration

Figure 8B:
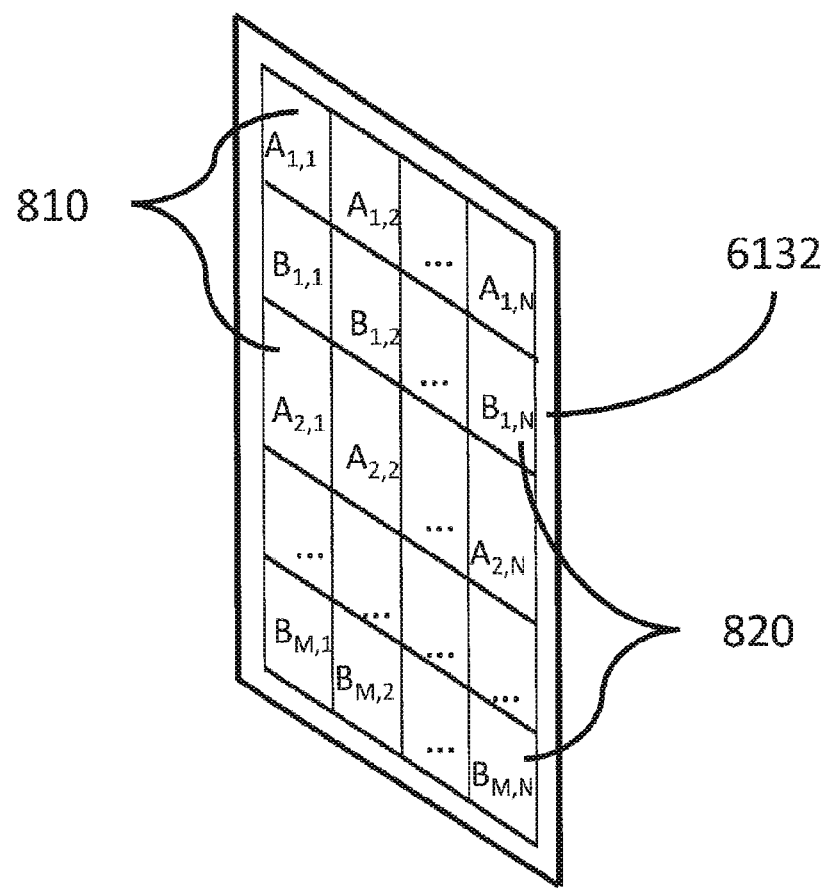
FIG. 8b shows a schematic view of an interlaced sensor configuration in a thermal imaging device, in accordance with one or more embodiments of the disclosure.

FIG. 8b shows a schematic view of an infrared sensor 6132 in a thermal imaging device configured to capture a gas IR image and a background IR image according to one or more embodiments. This can also be referred to as an interlaced sensor configuration and has the additional advantage of eliminating the need for aligning or registering the gas image and the background image.

A first infrared (IR) imaging system, comprised in the thermal imaging device 170 (cf. FIG. 6), comprises an image sensor 6132 configured with a first set of detector elements for capturing gas related radiation, here called a gas set of detector elements 810, and with a second set of detector elements for capturing background related radiation, here called a background set of detector elements 820. The rows of detector elements are interlaced such that gas set detector elements 810 capturing infrared radiation within a high absorption wavelength band A alternate with background set detector elements 820 capturing infrared radiation within a low absorption wavelength band B in rows of the sensor 6132. For example, gas set detector elements 810 may be configured on even rows and background set of detector elements 820 on odd rows.

The processor 612 is adapted to send control data to configure the gas set detector elements 810 to capture radiation within the high absorption wavelength band A and to configure background set detector elements 820 to capture radiation within the low absorption wavelength band B. The processor 612 is further adapted to send control data to the first infrared (IR) imaging system to trigger the capturing of a gas IR image by the gas set detector elements 810 and to trigger the capturing of a background IR image by the background set detector elements 820.

Woven Sensor Configuration—Water Image

Figure 9:
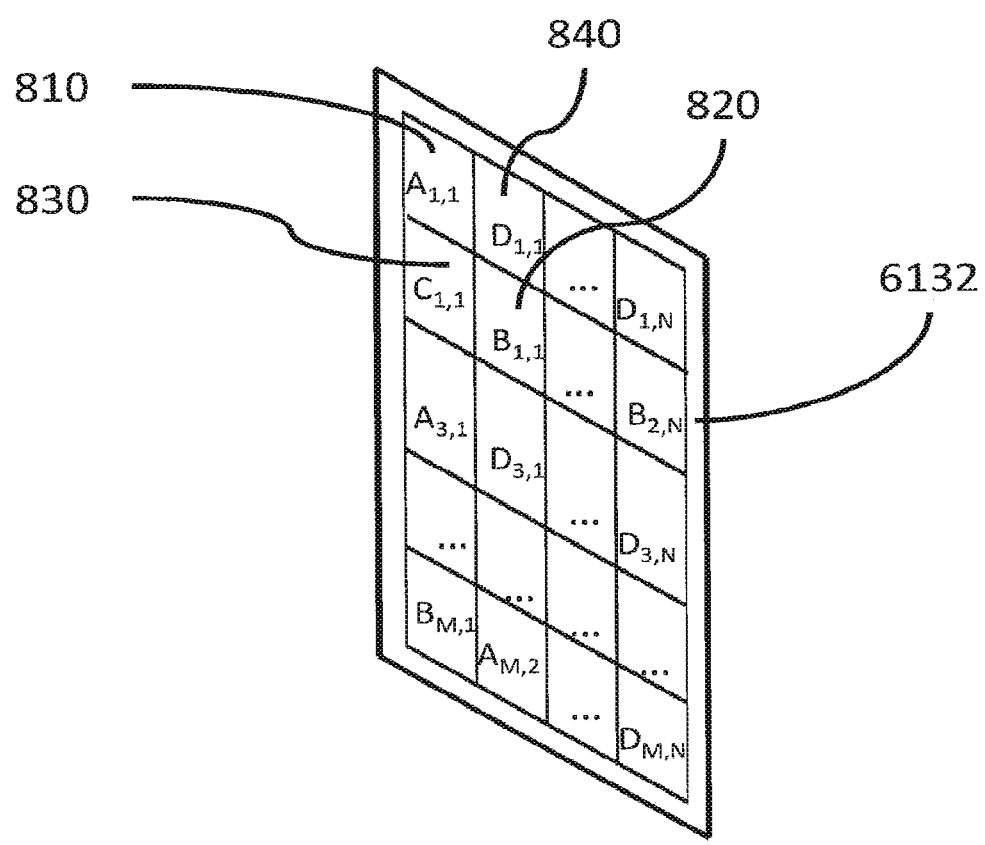
FIG. 9 shows a schematic view of a woven sensor configuration in a thermal imaging device, in accordance with one or more embodiments of the disclosure.

FIG. 9 shows a schematic view of an infrared sensor 6132 in a thermal imaging device configured to capture a gas IR image, a background IR image and a third image here called water image according to one or more embodiments addressing varying water vapor absorption or interference. This can also be referred to as a woven sensor configuration and has the additional advantages of eliminating the need for aligning or registering the gas image and the background image in addition to obtaining images used to compensate for noise/interference, e.g. due to water or steam or other gases in the scene.

A first infrared (IR) imaging system, comprised in the thermal imaging device 170 (cf. FIG. 6), comprises an image sensor 6132 configured with:

a first set of detector elements for capturing gas related radiation, here called a gas set of detector elements $A_{row,col}$ 810;

a second set of detector elements for capturing background related radiation, here called a background set of detector elements $B_{row,col}$ 820;

a third set of detector elements for capturing water or water vapour related radiation, here called a water set of detector elements $C_{row,col}$ 830; and a fourth set of detector elements for capturing interference related radiation, here called an interference set of detector elements $D_{row,col}$ 840.

The detector elements of the plurality of different sets are configured to form blocks of detector elements. Detector elements of the gas set, the background set, the water set and the interference set are woven such that one gas detector element 810 capturing infrared radiation within a high absorption wavelength band A, one background detector element 820 capturing infrared radiation within a low absorption wavelength band B, one water detector element 830 capturing infrared radiation within a third wavelength band C and one interference detector element 840 capturing infrared radiation again within the low absorption wavelength band B is arranged in a block of four detector elements, wherein the block is repeated over part of or the entire sensor 6132.

The processor 612 is adapted to send control data to configure the gas set detector elements 810 to capture infrared radiation within the high absorption wavelength band A, to configure the background set detector elements 820 to capture infrared radiation within the low absorption wavelength band B, to configure the water set detector elements 830 to capture infrared radiation within the third wavelength band C and to configure the interference set detector elements 840 to capture infrared radiation within the low absorption wavelength band B. The processor 612 is further adapted to send control data to the first infrared (IR) imaging system to trigger the capturing of a gas IR image by the gas set detector elements 810, to trigger the capturing of a background IR image by the background set detector elements 820, to trigger the capturing of a water IR image by the water set detector elements 830 and to trigger the capturing of an interference IR image by the interference set detector elements 840.

Method Embodiments

As described above one or more embodiments relate to an improved system and method of imaging gas, in particular passive infrared imaging of gas occurring in a scene. The gas is imaged based on a difference in an estimated gas temperature $T_G$ and an estimated background temperature $T_B$. Consequently, a greater difference between $T_G$ and $T_B$ will result in a greater contrast in the imaged gas in relation to background. When the estimation of $T_G$ and $T_B$ are improved, the sensitivity of the imaging system is improved and smaller amounts of gas can be detected and optionally imaged. With improved sensitivity of the imaging system, the contrast of the imaged gas is improved, e.g. in a gas-absorption-path-length image representing the length of the path of radiation from the scene background 110 through a gas occurrence in the scene.

Embodiments described herein thus increase the sensitivity of gas detection in an image, and thereby the contrast, by an improved and dynamic selection of a high absorption wavelength band A and a low absorption wavelength band B, e.g. based on previously captured gas and background IR images.

Figure 10:
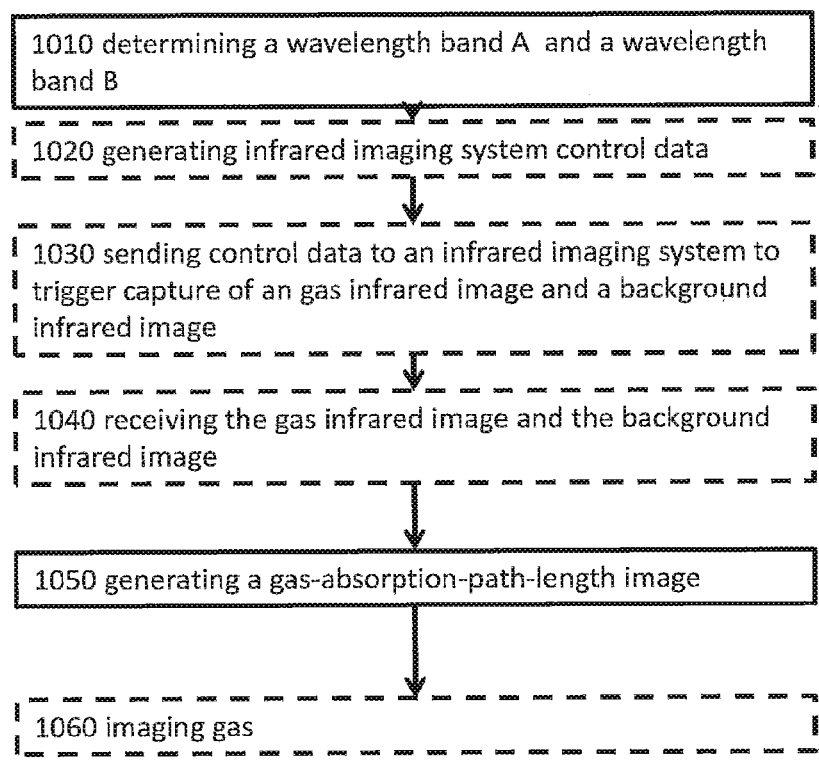
FIG. 10 is a block diagram illustrating method steps in accordance with one or more embodiments of the disclosure.

FIG. 10 shows schematically in a flow chart of a method for imaging gas in accordance with of one or more embodiments, comprising gas detection by generating a gas-absorption-path-length image.

Embodiments of the method comprise a selection of the following steps:

Step 1010: Determining, by a processor, a high absorption wavelength band A and a low absorption wavelength band B to improve contrast in a generated gas-absorption-path-length image based on a predetermined absorption spectrum of the gas, an estimated gas temperature $T_G$ and an estimated background temperature $T_B$, wherein the high absorption wavelength band A includes an absorption wavelength band G from the absorption spectrum and wherein the low absorption wavelength band B at least partially overlaps the high absorption wavelength band A.

Further, the high absorption wavelength band A is for example determined as a subset band of a predetermined absorption spectrum including a local maximum and the low absorption wavelength band B is for example determined as a subset band of the predetermined absorption spectrum including a local minimum and partially overlapping the high absorption wavelength band A.

The step 1010 of determining the high absorption and low absorption wavelength bands may further comprise estimating the gas temperature $T_G$ and estimating the background temperature $T_B$.

An estimated gas temperature $T_G$ is for example obtained as pixel values or processed pixel values of a previously captured gas image. Estimating a gas temperature $T_G$ by processing pixel values comprised in a previously captured gas IR image may comprise a selection of:

processing pixel values of a gas IR image to a single value.

processing pixel values comprising calculating a statistical measure based on the pixel values. The statistical measure is for example a selection of an arithmetic mean, a median value, a maximum value, a minimum value or a weighted average value.

In another example the estimated gas temperature $T_G$ is obtained as a measured ambient air temperature value retrieved from an ambient air temperature sensor 619.

An estimated background temperature $T_B$ is for example obtained as pixel values or processed pixel values of a previously captured background IR image. Estimating a background temperature $T_B$ by processing pixel values comprised in a previously captured gas IR image may comprise a selection of:

processing pixel values of a background IR image to a single value.

processing pixel values comprising calculating a statistical measure based on the pixel values. The statistical measure is for example a selection of an arithmetic mean, a median value, a maximum value, a minimum value or a weighted average value.

Step 1020 Optional: Generating infrared imaging system control data dependent on the determined high absorption wavelength band A and the low absorption wavelength band B. This step is optionally comprised in one or more embodiments.

This step comprises in one or more embodiments generating control data adapted for controlling a thermal imaging system or components thereof to capture radiation within a selection of a high absorption wavelength band A and a low absorption wavelength band B.

In one example of step 1020, infrared imaging system control data is generated as a data structure comprising data indicative of a lower endpoint of high absorption wavelength band A, a lower endpoint of a low absorption wavelength band B, a higher endpoint of high absorption wavelength band A, a higher endpoint of low absorption wavelength band B. The control data may preferably also comprise timing information for triggering the capturing of a gas IR image and a background IR image.

Step 1030 Optional: Sending control data to trigger the capturing of an image. This step is optionally comprised in one or more embodiments.

This step typically comprises sending control data, by a processor, to an infrared imaging system to trigger the capturing of a gas IR image of a scene and to trigger the capturing of a background IR image of the scene. In examples of step 1030, the generated infrared imaging system control data is sent, from the processor 612, as a control signal to the first infrared imaging system 613 and/or the second infrared imaging system 614.

Step 1040 Optional: Receiving, by the processor, a gas IR image and a background IR image.

This step is optionally comprised in one or more embodiments.

In one example of step 1040, receiving the gas IR image and the background IR image comprises the processor 612 receiving a control signal from the first infrared imaging system 613 and/or the second infrared imaging system 614 and storing the gas IR image comprising pixel values and the background IR image comprising pixel values to a memory.

Step 1050: Generating a gas-absorption-path-length image based on a gas IR image and a background IR image.

In one or more embodiments of step 1050, a gas-absorption-path-length image is generated for example by generating image pixel values by a selection of the following pixel operations based for example on a gas to background difference relation wherein subtraction is denoted "−" and division is denoted "/":

(gas image pixel value $A_{row,col}$−background image pixel value $B_{row,col}$);

(background image pixel value $B_{row,col}$−gas image pixel value $A_{row,col}$);

(gas image pixel value $A_{row,col}$/background image pixel value $B_{row,col}$);

or (background image pixel value $B_{row,col}$/gas image pixel value $A_{row,col}$).

The pixel values of gas IR image typically comprises a representation of the intensity of infrared radiation within the high absorption wavelength band A and the pixel values of background IR image typically comprises intensity of infrared radiation within the low absorption wavelength band B.

Step 1060 Optional: Imaging gas and visualizing gas based on pixel values in the gas-absorption-path-length image. This step is optionally comprised in one or more embodiments.

To enable a user to understand the information in the gas-absorption-path-length image it is further imaged by generating a visual representation and presenting it on a display in the thermal imaging device or in a computing device connected to the thermal imaging device such as a tablet computer, a smartphone, a laptop or a desktop computer.

In one example of step 1060, imaging gas is performed by generating a visual representation of the gas-absorption-path-length image using false coloring, wherein generating a visual representation further comprises mapping pixel values in the gas-absorption-path-length image to a palette and generating a display gas image. In yet an example, the palette may comprise colors or greyscales from a predefined color model. The step of imaging gas would typically further comprise presenting the display gas image on a display in the thermal imaging device or on a display comprised in an external device.

Optimizing Range of A/D Converter

An aspect comprised in one or more embodiments is provided for the purpose of ensuring that the analog to digital conversion range or dynamics is used in an optimal way in the IR detector or sensor to improve contrast without limiting the gas to background temperature difference $\Delta T$ whilst remaining within the linear operating area of the detector.

A problem when imaging gas is that the sensitivity of the thermal imaging system, and thus the contrast in the gas-absorption-path-length image, is further dependent on the analog to digital conversion process.

The sensors 6132, 6134 are generally generating an analog output signal, e.g. a voltage is the measurable output for bolometers. The analog signal must be analog to digital converted to obtain an image data value or pixel value. Analog to digital conversion is typically performed by an (A/D) analog to digital converter operating with an A/D working area defined as minimum A/D value, maximum A/D value and a resolution measured in number of bits. The minimum A/D value and maximum A/D value in a thermal imaging device 170, are typically limited by the operating area where the sensors 6132, 6134 have a linear response.

Figure 11:
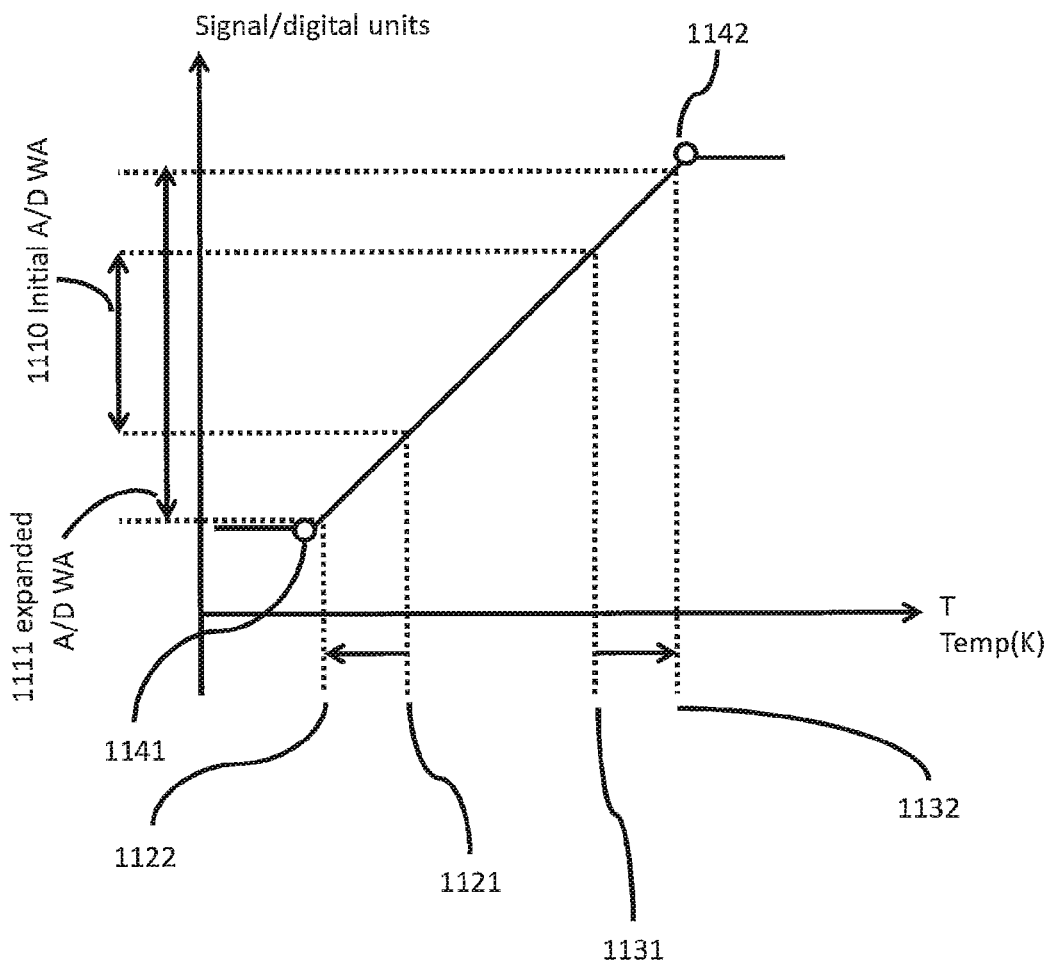
FIG. 11 shows a schematic view of an operating area of a sensor and the mapping to an A/D working area, in accordance with one or more embodiments of the disclosure.

FIG. 11 shows a schematic view of an operating area of a sensor and the mapping to A/D working area.

The sensor 6132, 6134 (cf. FIG. 6-9) has predefined response characteristics, e.g. determined by calibration measurements during the production of the thermal imaging device as a response characteristics relation. A subset of the response characteristics is linear, substantially linear or linear in practical circumstances and is limited by a minimum temperature $T_{DetMin}$ 1141 and a maximum temperature $T_{DetMin}$ 1142.

A problem is then to determine a minimum A/D value and a maximum A/D value to improve imaging of gas, i.e. improve sensitivity to detecting gas and thus contrast in the gas-absorption-path-length image. If the A/D working area, i.e. minimum A/D value and maximum A/D value, is set such that parts of the temperature range $(T_B-T_G)$ or $(T_G-T_B)$ is excluded the sensitivity of passive gas imaging and thus contrast in the gas-absorption-path-length image is reduced. If, on the other hand, the A/D working area, i.e. minimum A/D value and maximum A/D value, is set such that they extend below $T_{DetMin}$. 1141 and/or beyond $T_{DetMax}$ 1142, then non-linear contribution are included and the sensitivity of passive gas imaging and thus contrast in the gas-absorption-path-length image is reduced.

Typically the A/D working area can be set to a predetermined initial A/D working area, an initial minimum A/D value$_N$ 1121 and an initial maximum A/D value$_N$ 1131, selected from a predetermined set of ranges, e.g. determined by calibration measurements during the production of the thermal imaging device. According to one or more embodiments the A/D working area should be set as close to the temperature range $(T_B-T_G)$ or $(T_G-T_B)$ as possible. In a thermal imaging device this is controlled by changing control parameters as a detector temperature offset value $T_{offset}$ and a detector integration time $T_{int}$, wherein the detector temperature offset value $T_{offset}$ determine the initial minimum A/D value$_N$ 1121 and the detector integration time $T_{intN}$ determine the initial maximum A/D value 1131 based on a predetermined calibration relation, e.g. determined by calibration measurements during the production of the thermal imaging device.

In one example, an initial A/D working area 1110, defined by an initial minimum A/D value$_N$ 1121 as $T_{offsetN}$ and initial maximum A/D value$_N$ 1131 given by the detector integration time $T_{intN}$ and a predetermined calibration relation, is obtained, e.g. selected from a predetermined set of ranges or retrieved from memory.

Depending on if the imaged gas 160 or the background scene 110 (cf. FIG. 1) has the relatively lowest temperature an updated minimum A/D value$_{N+1}$ 1122 can be determined as background temperature TB or gas temperature TG, e.g. obtained from memory. I.e. determined as an updated minimum A/D value$_{N+1}$ 1122=minimum(TB,TG). A gas to background temperature difference $\Delta T$ 130 is calculated based on background temperature TB 122, gas temperature TG 121 and a gas to background difference relation (GSBDR) 140. An updated maximum A/D value$_{N+1}$ 1132 is determined as updated minimum A/D value$_{N+1}$ 1122+$\Delta T$ 130. Further, the updated maximum A/D value$_{N+1}$ 1132 is compared to $T_{DetMax}$ 1142 to determine that the updated maximum A/D value$_{N+1}$ 1132 is below $T_{DetMax}$ 1142. If the updated maximum A/D value$_N$ 1132 is below $T_{DetMax}$ 1142 then the updated maximum A/D value$_{N+1}$ 1132 is used as the higher limit of the A/D working area and if the maximum A/D value$_{n+1}$ 1132 is above $T_{DetMax}$ 1142 then an updated detector integration time $T_{intUpdated(N+1)}$ is determined based on the updated maximum A/D value$_{N+1}$ 1132 and an inverse predetermined calibration relation.

A new updated maximum A/D value$_{N+2}$ 1132 can be determined based on $T_{intUpdated(N+2)}$, a predetermined integration time step $\Delta T_{int}$ and the predetermined calibration relation, wherein a new updated maximum A/D value$_{N+2}$ 1132 is determined as $T_{intUpdated(N+2)}=T_{intUpdated(N+1)}-\Delta T_{int}$, wherein N is the iteration order or index.

Further, the new updated maximum A/D value$_{N+2}$ 1132 is compared to $T_{DetMax}$ 1142 to determine that the new maximum A/D value$_{N+2}$ 1132 is below $T_{DetMax}$ 1142. If so then the new updated maximum A/D value$_{N+2}$ 1132 is used as the higher limit of the A/D working area, else another iteration is performed and a new updated maximum A/D value$_{N+3}$ 1132 is determined.

Further, the updated minimum A/D value$_{N+1}$ 1122 is compared to $T_{DetMin}$ 1141 to determine that the updated minimum A/D value$_{N+1}$ 1122 is above $T_{DetMin}$ 1141. If the updated minimum A/D value$_{N+1}$ 1122 is below $T_{DetMin}$ 1141 the updated minimum A/D value$_{N+1}$ 1122 is set to $T_{DetMin}$ 1141 and is used as the lower limit of the A/D working area.

In another example, an initial A/D working area 1110, defined by an initial minimum A/D value$_N$ 1121 as $T_{offsetN}$ and initial maximum A/D value$_N$ 1131 given by $T_{intN}$ and a predetermined calibration relation, is obtained, e.g. selected from a predetermined set of ranges.

Depending on if the imaged gas 160 or the background scene 110 has the relatively lowest temperature $T_{offset}$ can be determined as TB or TG, thus as updated minimum A/D value$_N$ 1122=minimum(TB,TG). An initial $T_{intN}$ for the initial A/D working area 1010 can stepwise be increased by an integration time step $\Delta T_{int}$ and an updated maximum A/D value$_{N+1}$ 1132 can be determined based on the initial integration time $T_{intN}$ or a integration time determined in a previous iteratation $T_{intUpdated(N)}$, integration time step $\Delta T_{int}$ and the predetermined calibration relation, wherein N is the iteration order or index, wherein $T_{intUpdated(N+1)}$ is determined as equal to $(T_{intN}+\Delta T_{int})$ or $(T_{intUpdated(N)}+\Delta T_{int})$.

Further, the updated maximum A/D value$_{N+1}$ 1132 is compared to $T_{DetMax}$ 1142 to determine that the updated maximum A/D value$_{N+1}$ 1132 is below $T_{DetMax}$ 1142. If the maximum A/D value$_{N+1}$ 1132 is above $T_{DetMax}$ 1142 then $T_{intUpdated(N+1)}=$is determined as the previously determined updated maximum A/D value$_N$ 1132 is used as the higher limit of the A/D working area else another iteration is performed and a new updated maximum A/D value$_{N+2}$ 1132 is determined.

Further, the updated minimum A/D value$_N$ 1122 is compared to $T_{DetMin}$ 1141 to determine that the updated minimum A/D value$_N$ 1122 is above $T_{DetMin}$ 1141. If the updated minimum A/D value 1122 is below $T_{DetMin}$ 1141 the updated minimum A/D value 1122 is set to $T_{DetMin}$ 1141 and is used as the lower limit of the A/D working area.

In one or more embodiments, the method comprises the steps of:
Determining an initial A/D working area 1110.
Determining an updated minimum A/D value$_{N+1}$ 1122 and an updated maximum A/D value$_{N+1}$ 1132 based on gas temperature $T_G$ and background temperature $T_B$.
Determining that the updated maximum A/D value$_{N+1}$ 1132 is below $T_{DetMax}$ 1142 and determining the updated maximum A/D value$_{N+1}$ as the higher limit of the expanded A/D working area 1111.
Determining that the updated minimum A/D value$_N$ 1122 is above $T_{DetMin}$ 1141 and determine as the lower limit of an expanded A/D working area.

A deltaT Based Optimization, Top Down

In one or more embodiments, comprising a deltaT based optimization, wherein the updated minimum A/D valueN+1 1122 is determined as minimum($T_B$,$T_G$), the method may further comprise the following steps:

Step 1505: Obtaining a predetermined integration time step $\Delta T_{intN}$, e.g. from memory.

Step 1510: Determining a background temperature difference $\Delta T$ 130 based on $T_B$ (122), $T_G$ (121) and a gas to background difference relation (GSBDR) (140), wherein the updated maximum A/D value$_{N+1}$ (1132) is determined as updated minimum A/D value$_{N+1}$ (1122)+ $\Delta T$ (130).

Step 1515: Determining that the maximum A/D value$_{n+1}$ 1132 is above $T_{DetMax}$ 1142 and perform the following steps:

Step 1520: Determining an updated detector integration time $T_{intUpdated(N+2)}$ based on the updated maximum A/D value$_{N+1}$ 1132 and an inverse predetermined calibration relation.

Step 1525: Determining an iterated updated maximum A/D value$_{N+2}$ 1132 based on a new updated integration time $T_{intUpdated(N+2)}$, a predetermined integration time step $\Delta T_{in}t$ and the predetermined calibration relation, wherein a new updated integration time is determined as $T_{intUpdated(N+2)} = T_{intUpdated(N+1)} - \Delta T_{intN}$.

Step 1530: Iterating steps 1515-1525.

$T_{int}$ Based Optimization, Bottom Up

In one or more embodiments, comprising a tint bases optimization, wherein the updated minimum A/D valueN+1 1122 is determined as minimum($T_B$,$T_G$), and wherein the initial A/D working area 1110 is defined by an initial minimum A/D value$_N$ 1121 as $T_{offsetN}$ and initial maximum A/D value$_N$ 1131 given by integration time $T_{intN}$ and a predetermined calibration relation, the method may further comprise the following steps:

Step 1605: Obtaining a predetermined integration time step $\Delta T_{int}$, e.g. from memory.

Step 1610: Determining an updated detector integration time $T_{intUpdated(N+1)}$ based on $\Delta T_{intN}$ and predetermined integration time step $\Delta T_{int}$, wherein the updated integration time is determined as $T_{intUpdated(N+1)} = T_{int(N)} + \Delta T_{int}$.

Step 1615: Determining the updated maximum A/D value$_{N+1}$ 1132 is based on the updated detector integration time $T_{intUpdated(N+1)}$ and the predetermined calibration relation.

Step 1620: Determining that the maximum A/D value$_{n+1}$ 1132 is below $T_{DetMax}$ 1142 and perform the following steps:

Step 1625: determine an updated detector integration time $T_{intUpdated(N+2)}$ based on $\Delta T_{intN+1}$ and predetermined integration time step $\Delta T_{int}$, wherein the updated integration time is determined as $T_{intUpdated(N+2)} = T_{intUpdated(N+1)} + \Delta T_{int}$.

Step 1630: Determining updated maximum A/D value$_{N+2}$ 1132 based on the updated detector integration time $T_{intUpdated(N+2)}$ and the predetermined calibration relation.

Step 1635: Iterating steps 1620-1630

In one or more embodiments, the generated infrared imaging system control data further comprises Toffset and Tint as determined in a selection of the above method steps.

Figure 12:
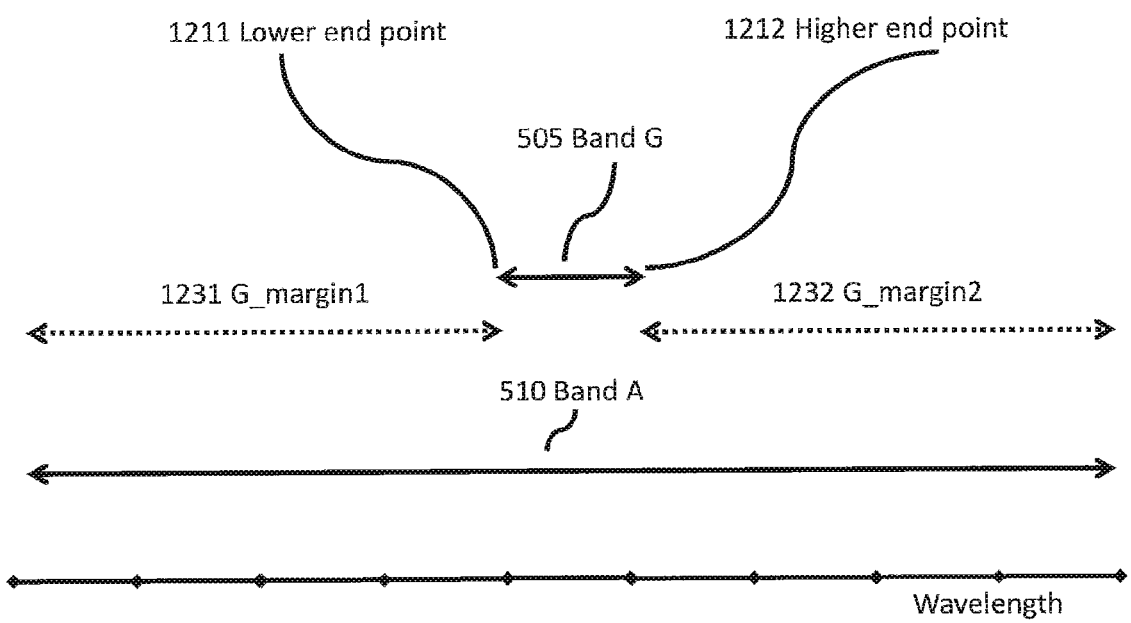
FIGS. 12 and 13a-c illustrate schematically how a first, high absorption wavelength band A and second, low absorption wavelength band B are determined, in accordance with one or more embodiments of the disclosure.

Determining High Absorption Wavelength Band A and Low Absorption Wavelength Band B FIG. 12 (also cf. FIGS. 2a and 2b) shows how high absorption wavelength band A 510 and low absorption wavelength band B 520 are determined in one or more embodiments. A gas related wavelength band G 505 comprising a subset of the absorption spectrum 241 of a gas in the scene and including at least a local maximum of the absorption spectrum 241 is determined. In one example wavelength band G is selected to include multiple local maxima of the absorption spectrum 241 to obtain sufficient signal to noise ratio at the sensor 613, 614 of a thermal imaging system, as would be understood by a person skilled in the art.

In one or more embodiments, determining a high absorption wavelength band A and a low absorption wavelength band B as described above further comprises: determining gas related wavelength band G based on the absorption spectrum of the gas, wherein wavelength band G is determined to include at least one local maximum of the absorption spectrum.

The wavelength band A is preferably determined to include wavelength band G 505. To safeguard that the wavelength dependent infrared radiation attenuation effect of the local maximum/maxima is captured, a lower margin G_MARGIN1 1231 and a higher margin G_MARGIN2 1232 are added to the low absorption wavelength band B 505. In one example G_MARGIN1 and G_MARGIN2 are selected in the magnitude of 5%-30% of the width of gas related wavelength band G 505. G_MARGIN1 (1231) is applied to the lower endpoint (1211) of gas related wavelength band G (505) and wavelength margin G_MARGIN2 (1232) is applied to the higher endpoint (1212) of gas related wavelength band G (505). Thus in one or more embodiments, determining a high absorption wavelength band A 510 and a low absorption wavelength band B 520 further comprises: determining the high absorption wavelength band A as including a gas related wavelength band G (505) and a predetermined wavelength margin G_MARGIN1 (1231) applied to the lower endpoint (1211) of gas related wavelength band G (505) and a predetermined wavelength margin G_MARGIN2 (1232) applied to the higher endpoint (1212) of the gas related wavelength band G (505).

Figure 13A:
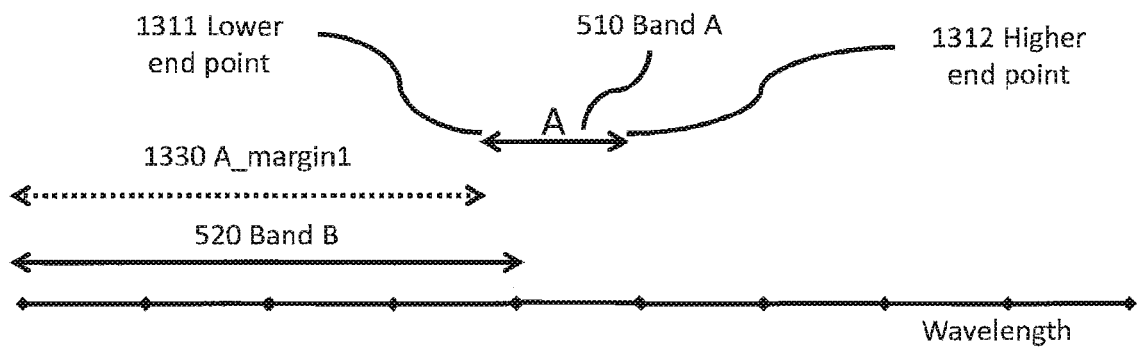

FIG. 13a shows how a high absorption wavelength band A 510 and a low absorption wavelength band B 520 are determined in one or more embodiments. The low absorption wavelength band B 520 is determined to at least partially overlap with the high absorption wavelength band A 510. To safeguard that the wavelength dependent infrared radiation attenuation effect of the local maximum/maxima is captured at the same time as eliminating the need to compensate for wavelength dependent emittance/emissivity variations, a lower margin A_MARGIN1 1331 is added to the high absorption wavelength band A 510 and applied to the lower endpoint 1311 of the high absorption wavelength band A 510. In one example, A_MARGIN1 1311 is selected in the magnitude of 50%-300% of the width of wavelength band A 510.

Figure 13B:
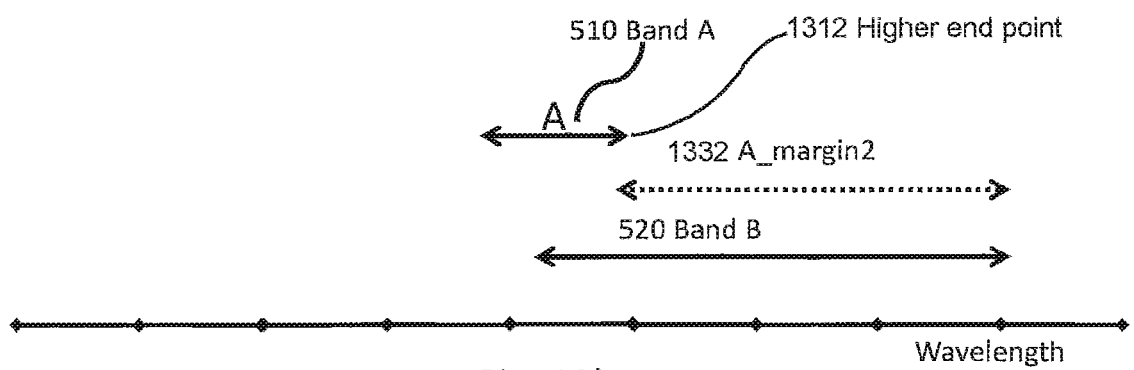

FIG. 13b shows how a high absorption wavelength band A 510 and a low absorption wavelength band B 520 are determined in one or more embodiments. The low absorption wavelength band B 520 is determined to at least partially overlap the high absorption wavelength band A 510. To safeguard that the wavelength dependent infrared radiation attenuation effect of the local maxima/s is captured at the same time as eliminating the need to compensate for wavelength dependent emittance/emissivity variations, a higher margin A_MARGIN2 1332 is added to the high absorption wavelength band A 510 and applied to the higher endpoint 1312 of the high absorption wavelength band A 510. In one example A_MARGIN2 1312 is selected in the magnitude of 50%-300% of the width of wavelength band A 510.

Figure 13C:
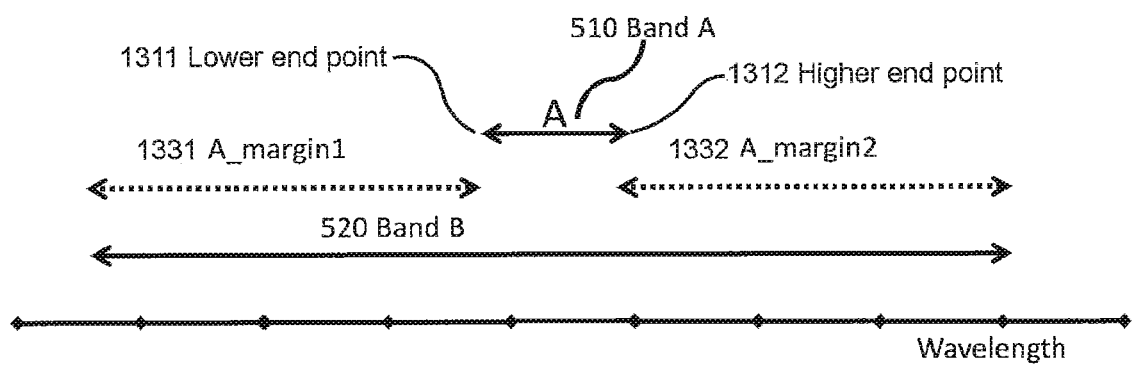

FIG. 13c shows how a high absorption wavelength band A 510 and a low absorption wavelength band B 520 are determined in one or more embodiments. The low absorption wavelength band B 520 is determined to at least partially overlap the high absorption wavelength band A 510. To safeguard that the wavelength dependent infrared radiation attenuation effect of the local maxima/s is captured at the same time as eliminating the need to compensate for wavelength dependent emittance/emissivity variations, a higher margin A_MARGIN2 1332 is added to the high absorption wavelength band A 510 and applied to the higher endpoint 1312 of the high absorption wavelength band A 510 and lower margin A_MARGIN1 1331 added to the high absorption wavelength band A 510 and applied to the lower endpoint 1311 of the high absorption wavelength band A 510. In one example A_MARGIN1 1331 and A_MARGIN2 1332 are selected in the magnitude of 50%-300% of the width of wavelength band A 510. Thus in one or more embodiments, determining a high absorption wavelength band A 510 and a low absorption wavelength band B 520 further comprises: determining the low absorption wavelength band B 520 as having a width greater than the high absorption wavelength band A 510 and having a lower endpoint a margin A_MARGIN1 1331 below the lower endpoint 1311 of the high absorption wavelength band A 510 and/or having the higher endpoint a margin A_MARGIN2 1332 above the higher endpoint 1312 of the high absorption wavelength band A.

Dynamically Determining Wavelength Band

In one or more embodiments, a low absorption wavelength band B 520 is determined dynamically based on a preceding observation of the scene captured in a gas related image, for example a gas-absorption-path-length image generated in a preceding step.

This is, in one or more embodiments, carried out by:
generating candidate wavelength bands by shifting the low absorption wavelength band B 520 in predetermined steps relative to the high absorption wavelength band A 510;
generating a resulting absorption-path-length image based on each candidate wavelength band;
evaluating an objective function applied on the resulting gas-absorption-path-length image generated for each candidate wavelength band; and
determining the low absorption wavelength band B as the candidate wavelength band that represents a local maximum of the evaluated objective function values.

In one example a predetermined width of the low absorption wavelength band B, a wavelength band step size, an objective function and a wavelength band start position is obtained, e.g. as depicted in FIG. 13a based on A_MARGIN1 1331 or retrieved from memory. A candidate wavelength band is determined based on the wavelength band start position and a multiple of the wavelength band step size. A gas-absorption-path-length image is generated based on the candidate wavelength band, as described above, and an objective function is evaluated on the gas-absorption-path-length image to generate an objective function value, the candidate wavelength band and the corresponding objective function value is saved in memory as a pair in a data structure. The process is repeated by shifting the low absorption wavelength band B by a multiple of the wavelength band step size until a wavelength band constraint is exceeded, e.g. when the higher endpoint of the candidate wavelength band exceeds the higher endpoint of wavelength band A 510 extended by A_MARGIN2 1332 as depicted in FIG. 13b. Further, a local minimum of the objective function values is determined and an optimized wavelength band B is generated by determining the corresponding candidate wavelength band as wavelength band B 520.

A further method, in accordance with one or more embodiments, of determining a high absorption wavelength band A 510 and a low absorption wavelength band B 520 further comprises the following steps:

Step 1710: Obtaining a predetermined width of a low absorption wavelength band B, a wavelength band step size, an objective function and a wavelength band start position.

Step 1720: Determining a candidate wavelength by shifting the low absorption wavelength band B based on the wavelength band start position, the width of wavelength band B and a multiple of the wavelength band step size, wherein wavelength band B is shifted within a wavelength band constraint.

Step 1725: Generating a gas-absorption-path-length image based on the candidate wavelength band.

Step 1730: Evaluating an objective function on the pixel values comprised in the gas-absorption-path-length image to generate an objective function value.

Step 1740: storing the candidate wavelength band and the corresponding objective function value as a pair in a data structure, e.g. to memory.

Step 1750: Repeating method steps 1720, 1730, 1740 until a wavelength band constraint is exceeded.

Step 1760: Determining a local maximum of the stored objective function values in each stored pair.

Step 1770: Generating an optimized low absorption wavelength band B by determining the candidate wavelength band in the pair as low absorption wavelength band B 520.

Step 1780: Controlling the thermal imaging system to generate a gas IR image, for example a gas-absorption-path-length image based on the optimized low absorption wavelength band B.

A further option in one or more embodiments, when determining the low absorption wavelength band B comprises excluding the absorption wavelength band G from low absorption wavelength band B.

Example of Generating a Gas-Absorption-Path-Length Image

Figure 14:
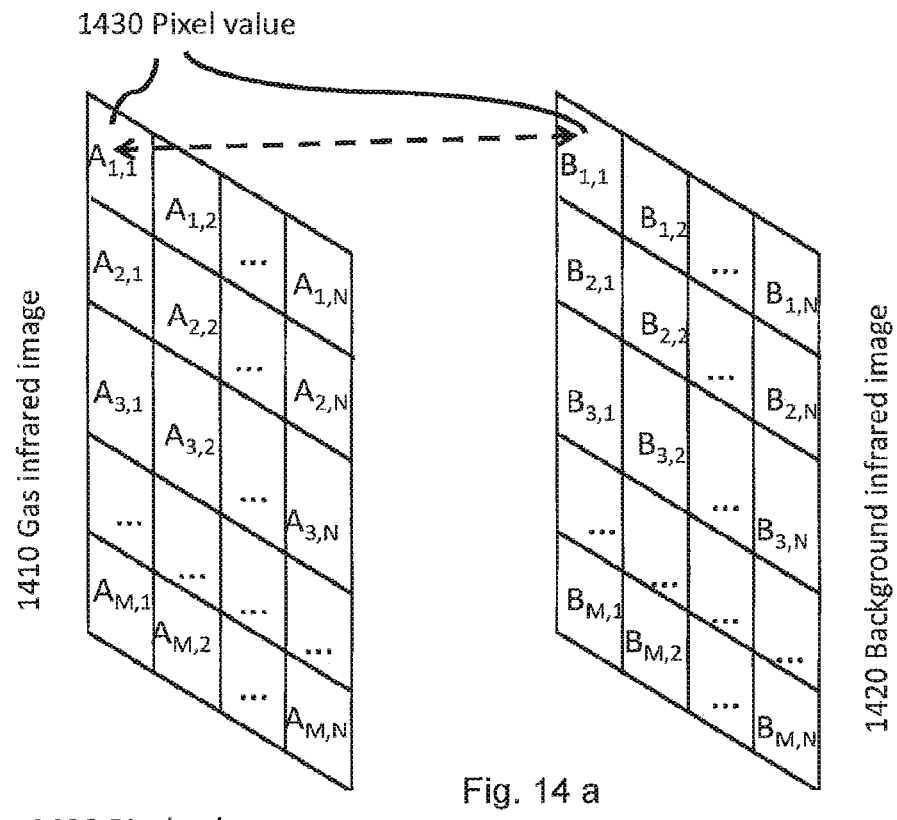
FIG. 14a illustrates schematically how a gas-absorption-path-length image is generated in a thermal imaging device comprising a first infrared imaging system, in accordance with one or more embodiments of the disclosure.
FIG. 14b illustrates schematically how a gas-absorption-path-length image is generated in a thermal imaging device comprising a first infrared imaging system and a second infrared imaging system, in accordance with one or more embodiments of the disclosure.
Figure 14:
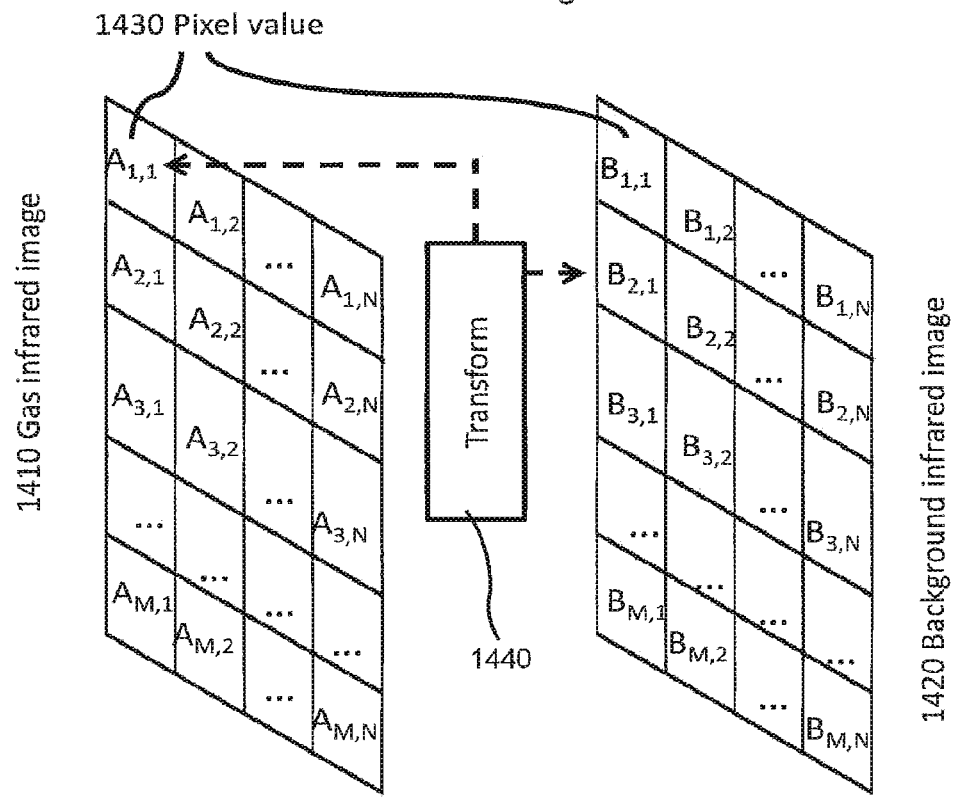

FIG. 14a illustrates schematically how a gas-absorption-path-length image is generated in accordance with one or more embodiments, with a thermal imaging device 170 comprising an infrared thermal imaging system 613, e.g. as depicted e.g. in FIGS. 6 and 7b to 9. In this example, the same thermal imaging system is used to capture a gas IR image as well as a background IR image. FIG. 14a illustrates a gas IR image 1410 and a background IR image 1420 with their respective pixel values 1430, $A_{M,N}$ and $B_{M,N}$ respectively. The optical axis and the field of view (FOV) are then identical, thus pixel values comprised in the gas image and pixel values comprised in the background image always represent the same part of the scene 110 before combining them to a pixel value comprised in the gas-absorption-path-length image.

A gas-absorption-path-length image is, in accordance with one or more embodiments of this kind, thus generated by pixel operations using pixel values from the gas IR image and the background IR image. Different examples comprises a selection of the following operations:

gas-absorption-path-length image pixel $\text{value}_{1,1} = A_{1,1} - B_{1,1}$;

gas-absorption-path-length image pixel $\text{value}_{1,1} = B_{1,1} - A_{1,1}$;

gas-absorption-path-length image pixel value$_{1,1}$ = $B_{1,1}/A_{1,1}$;
and/or
gas-absorption-path-length image pixel value$_{1,1}$ = $A_{1,1}/B_{1,1}$.

FIG. 14b illustrates schematically how a gas-absorption-path-length image is generated in accordance with one or more embodiments, with a thermal imaging device 170 comprising a first infrared imaging system 613 and a second infrared imaging system 614, e.g. as depicted in FIGS. 6 and 7a. In this example, different thermal imaging systems are used to capture a gas IR image and a background IR image. FIG. 14b illustrates a gas IR image 1410 and a background IR image 1420 with their respective pixel values 1430, $A_{M,N}$ and $B_{M,N}$ respectively. The optical axis and the field of view (FOV) may differ leading to different parallax errors and/or different FOV size. To ensure that pixel values comprised in the gas image and pixel values comprised in the background image represent the same part of the scene 110 before combining them to a pixel value comprised in the gas-absorption-path-length image, they are registered or transformed into one coordinate system through a transform 1440, e.g. intensity-based registration, feature-based registration by using linear or elastic transformations.

A gas-absorption-path-length image is, in accordance with one or more embodiments of this kind, thus generated by pixel operations using pixel values from the gas IR image and the background IR image.

Different examples comprises a selection of the following operations:
gas-absorption-path-length image pixel value$_{1,1}$ = $A_{1,1}-B_{2,1}$;
gas-absorption-path-length image pixel value$_{1,1}$ = $B_{2,1}-A_{1,1}$;
gas-absorption-path-length image pixel value$_{1,1}$ = $B_{2,1}/A_{1,1}$;
and/or
gas-absorption-path-length image pixel value$_{1,1}$ = $A_{1,1}/B_{2,1}$.

Figure 15:
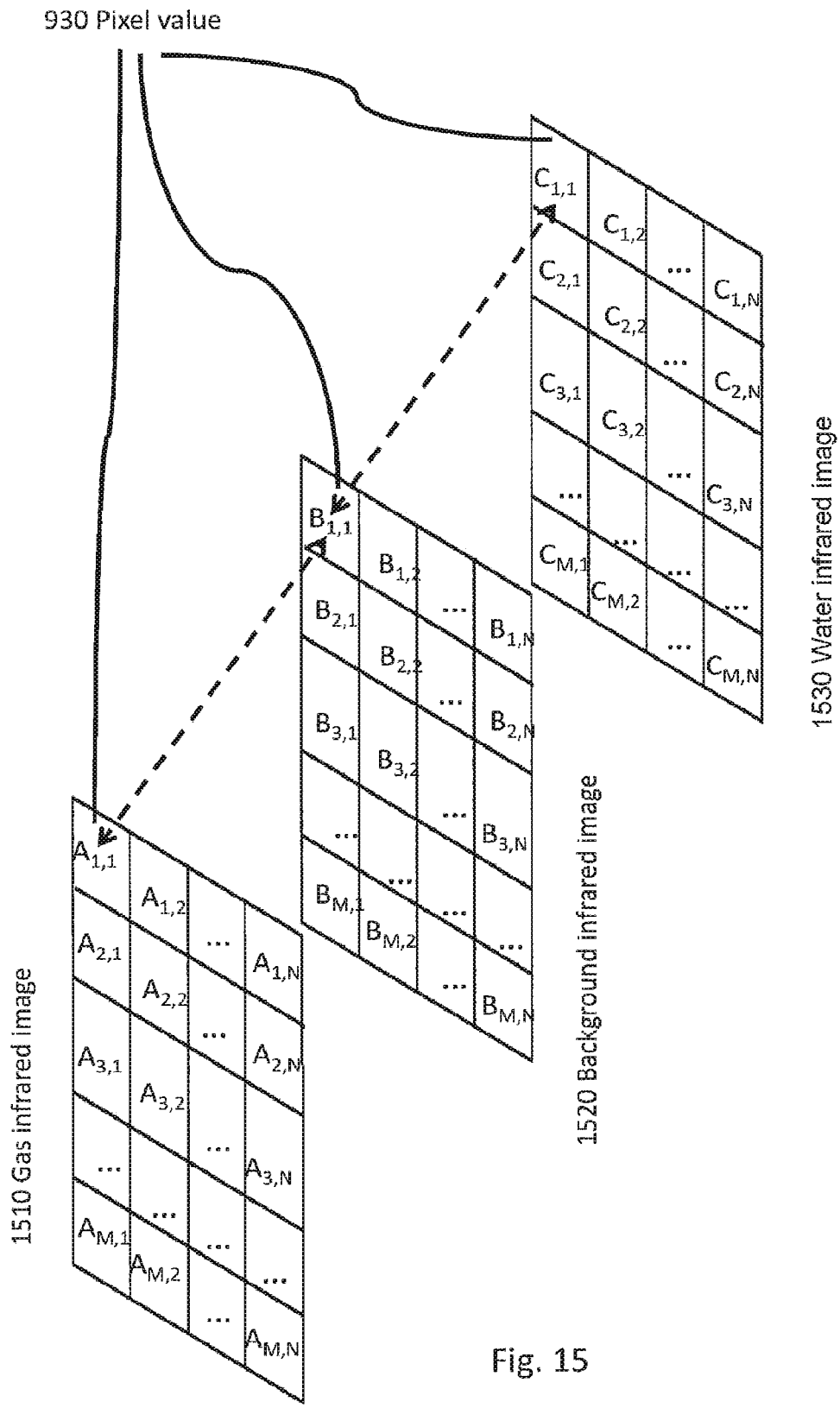
FIG. 15 illustrates schematically how a gas-absorption-path-length image is generated in a thermal imaging device by compensating for water attenuation of infrared radiation, in accordance with one or more embodiments of the disclosure.

FIG. 15 illustrates schematically how a gas-absorption-path-length image is generated in accordance with one or more embodiments, by compensating for water attenuation of infrared radiation using a thermal imaging device with one or more infrared imaging systems as described above. The sensitivity to detecting gas and thus contrast in the gas-absorption-path-length image is further improved by generating the gas-absorption-path-length image further based on a water IR image. A third, water related, wavelength band C is determined to improve contrast in a generated gas-absorption-path-length image based on a pre-determined water absorption spectrum. The water related wavelength band C includes at least a local minimum of the water absorption spectrum and preferably excludes both the high absorption wavelength band A and the low absorption wavelength band B. By determining the attenuation of infrared radiation in a wavelength band where the absorption spectrum for water has a at least a local minimum and where the gas show no or very low attenuation of infrared radiation, a measure of water attenuation in the water related wavelength band C, can be approximated to be valid also for the high absorption wavelength band A and the low absorption wavelength band B, thus the contribution of water attenuation can be compensated for. In one or more embodiments, water related wavelength band C is indicated in data comprised in infrared imaging system control data sent to the infrared imaging system.

A water IR image is captured by the high absorption or second infrared imaging system 613, 614 triggered by the control data, wherein the water IR image comprises intensity of infrared radiation within water related wavelength band C. The processor 612 receives the water IR image and generates an improved gas-absorption-path-length image based on a gas image, a background image and the water image;

A gas-absorption-path-length image is, in accordance with one or more embodiments of this kind, thus generated by pixel operations using pixel values from the gas IR image, the water IR image and the background IR image. Different examples of generating a gas-absorption-path-length image by combining pixel values comprised in the gas image, pixel values comprised in the background image and pixel values comprised in the water image comprises a selection of the following operations:
a gas-absorption-path-length image pixel value$_{1,1}$ = $A_{1,1}-B_{1,1+}-C_{1,1}$;
and/or
gas-absorption-path-length image pixel value$_{1,1}$ = $B_{1,1}-A_{1,1}+-C_{1,1}$.

Aligning

Since the gas and background IR image may be captured at different instances in time the thermal imaging device might be moved in a way such that the offset, direction and rotation around the optical axis differ between a gas IR image and a background IR image. Similarly, in one or more embodiments with multiple infrared imaging systems 613, 614, the orientation of optical axis of the first infrared imaging system 613 and the second infrared imaging system 614 might differ. This results in an optical phenomenon known as parallax distance error, parallax pointing error and parallax rotation error. Due to these parallax errors, the captured view of the real world scene might differ between IR images. In order to combine the gas image and the background image, the images must be adapted so that an adapted gas IR image and an adapted background IR image, representing the same part of the scene, is obtained, in other words, compensating for the different parallax errors and FOV size. This processing step is referred to as image registration or alignment of the first image and the second image, i.e. the process of transforming different sets of data into one coordinate system through a transform. Registration or alignment can be performed according to any method known to a skilled person in the art, e.g. intensity-based, feature-based registration using linear or elastic transformations.

Displaying Visualizing an Image, IR Image or Gas Image

As thermal images by nature are generally low contrast and noisy, the captured IR image or gas-absorption-path-length image may be subjected to various imaging processing in order to improve the interpretability of the image before displaying it to a user. Examples of such image processing is correction with IR temperature calibration data parameters, low pass filtering, registration of multiple successive IR image or gas images and averaging to obtain an averaged IR image or gas image or any other IR image or gas image processing operation known to a person skilled in the art. As infrared radiation is not visible to the human eye there are no natural relations between the captured IR image's or gas image's data values of each pixel in an IR image or gas image and the greyscale or the colors displayed on a display. Therefore, an information visualization process referred to as false coloring or pseudo coloring is used to map image data values or pixel values of each pixel in an IR image or gas-absorption-path-length to a palette used to present the corresponding pixel displayed on a display, e.g. using grey-scale or colors.

A palette is typically a finite set of color or grey-scale representations selected from a color model for the display of images or visual representations of IR images/gas-absorption-path-length images, i.e. a pre-defined palette represents a finite set of grayscale or color values of a color model displayable on a display thereby making it visible to the human eye. Mapping of captured infrared (IR) image data values of each pixel in an IR image or gas image data values of each pixel in a gas image to a palette used to present the corresponding pixel of a visual representation of said IR image displayed on a display is typically performed by applying a pre-determined relation. Such a pre-determined relation typically describes a mapping from image data values or pixel values to said pre-defined palette, e.g. a palette index value with an associated color or grey-scale representation selected from a color model. The gas visualizing IR image or gas-absorption-path-length image is typically displayed to an intended user based on the gas-absorption-path-length image data values or pixel values of each pixel in a gas-absorption-path-length image, optionally IR temperature calibration data parameters, a predefined palette representing a finite set of grayscale or color values of a color model displayable on a display and a pre-determined relation describing a mapping from infrared image data values or gas-absorption-path-length image pixel values to said pre-defined palette.

The processor of described thermal imaging devices is, in accordance with one or more embodiments, configured to perform a selection of any or all of the method steps described herein that are associated with processing of captured IR images or gas-absorption-path-length images comprising image data values or pixel values, such as selection of data values/pixel values, mapping of temperature values associated with the data values/pixel values to color and/or grayscale values, assigning each pixel of a frame of IR data values a representation value from a preselected color model, e.g. based on the associated temperature value of said pixel, and other operations described herein.

Infrared (IR) Optical System and Related Methods

Figure 16:
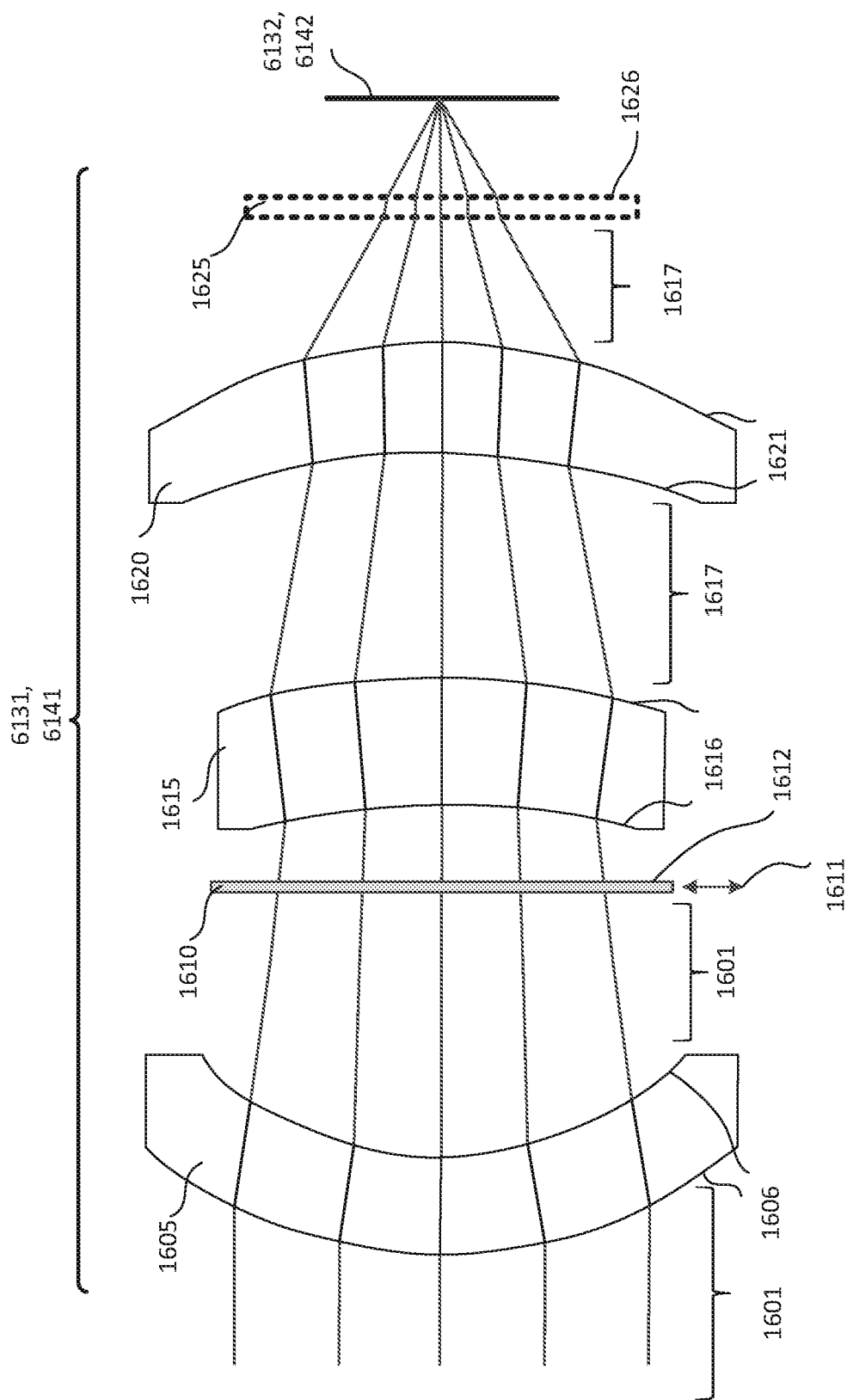
FIG. 16 illustrates an optical system and a detector, in accordance with one or more embodiments of the disclosure.

In various embodiments, infrared optical system 6131, 6141 may be configured to detect gas within a selectable wavelength band or a range of wavelengths of interest, such as high absorption wavelength band A and/or low absorption wavelength band B. Referring now to FIG. 16, in one or more embodiments, optical system 6131, 6141 may include a plurality of lens elements 1605, 1615, and 1620 configured to optically focus IR radiation 1601 from a scene. While three lens elements are shown, it should be understood that any number of lens elements may be used in optical system 6131, 6141.

Optical system 6131, 6141 may also include shutter 1610 and/or protective window 1625. Optical system 6131, 6141 may generally be enclosed within a housing (not shown in FIG. 16) to protect the different components from scratches and the environment.

In some embodiments, optical system 6131, 6141 may be fixed within thermal imaging device 170, and in other embodiments, optical system 6131, 6141 may be removable from thermal imaging device 170 such that different optical systems with different spectral and/or other optical characteristics may be attached to or coupled within thermal imaging device 170 for detection of different gases.

In various embodiments, optical system 6131, 6141 may be configured to detect gas within a selectable wavelength band. Optical system 6131, 6141 may be tuned such that the selectable wavelength band corresponds to a type of gas of interest to be detected within an imaged scene. For example, optical system 6131, 6141 may be tuned to detect the spectral absorption/emission region or range of wavelengths of methane ($CH_4$), which is 7-8.5 μm, sulfur hexafluoride ($SF_6$), which is 9.5-12 μm, and/or other gases or combinations of gasses. In some embodiments, optical system 6131, 6141 may be tuned to high absorption wavelength A to capture a gas IR image, low absorption wavelength B to capture a background IR image, and/or other wavebands as appropriate.

The first lens element in optical system 6131, 6141 is objective lens element 1605. In general, the term "objective" as used herein refers to a lens element, a lens surface, or other structure or portion of a structure that is closer to an imaged scene (e.g., the left side of FIG. 16) than to detector or image sensor 6132, 6142 (e.g., disposed on the right side of FIG. 16), and the term "subjective" as used herein refers to a lens element, a lens surface, or other structure or portion of a structure that is closer to detector or image sensor 6132, 6142 than to the imaged scene. In some embodiments, one or more coatings 1606, such as an antireflective coating and/or a durable protective coating, may be applied to one or both surfaces of objective lens element 1605.

An antireflective coating may have the property of reducing reflections of IR radiation generated by the objective and/or subjective surfaces of objective lens element 1605 and/or coatings 1606. Different coatings may have different antireflection characteristics. According to one or more embodiments, one or more of coatings 1606 may be implemented as an antireflective coating that is configured to reduce reflections of IR radiation 1601 within the wavelength band(s) of interest.

In various embodiments, either or both antireflective coatings 1606 (e.g., on either side of objective lens element 1605) may be implemented as a high efficiency antireflective (HEAR) coating that can be configured for relatively high transmission in a chosen spectral region. In some embodiments, the HEAR coating allows more than 90% of IR band radiation 1601 within the chosen spectral region to pass through objective lens element 1605 without generating a reflection on a surface of objective lens element 1605. In several embodiments, the HEAR coating allows more than 95% (or even 99%) of IR radiation 1601 within the chosen spectral region to pass through objective lens element 1605.

In some embodiments, a durable coating may be applied to one or both surfaces of objective lens element 1605. The durable coating may include a diamond-like carbon (DLC) coating or a high durability (HD) coating. While the performance of objective lens element 1605 may be somewhat degraded by such durable coatings, the resulting improved durability can be an advantage for certain applications (e.g., aerial reconnaissance).

A shutter 1610 may also be provided in optical system 6131, 6141, which can be used for non-uniformity correction (NUC) of detector or image sensor 6132, 6142. Shutter 1610 may be selectively positioned as indicated by arrow 1611 (e.g., through the operation of an actuator under the control of a logic device) in front of detector 6132, 6142, to block IR radiation 1601 from being received by detector 6132, 6142. For example, the actuator may position shutter 1610 such that detector 6132, 6142 may capture image frames of shutter 1610 for calibration purposes. In this regard, in some embodiments, shutter 1610 may provide a temperature controlled black body surface 1612 facing detector 6132, 6142 that is captured in one or more image frames by detector 6132, 6142 to determine correction values for rows, columns, and/or individual pixels associated with the sensors of detector 6132, 6142. The actuator may also position shutter 1610 to permit detector 6132, 6142 to capture image frames of IR radiation 1601 received from the scene when calibration is not taking place, where correction values may be applied to the image frames of the scene to provide temperature calibrated or radiometric thermograms of the scene.

The second lens element shown in the embodiments of optical system 6131, 6141 presented by FIG. 16 is spectral lens element 1615. Spectral lens element 1615 may be configured to help form an IR image (e.g., gas IR image or background IR image) on detector 6132, 6142 and to act as a spectral filter. Spectral lens element 1615 may be configured to filter IR radiation 1601 to a narrower wavelength band 1617 so that IR radiation 1601 within a particular wavelength band is allowed to pass through spectral lens element 1615 while IR radiation 1601 outside of the particular wavelength band is filtered or blocked.

In general, spectral lens element 1615 may be formed according to a variety of different lens shapes, so long as the lens surface closest to detector 6132, 6142 (e.g., the subjective surface of spectral lens element 1615) is convex, so that any reflections from elements to the right of spectral lens 1615 generally diverge if reflected back at detector 6132, 6142 (e.g., to help minimize any Narcissus effect caused by spectral lens element 1615). As such, spectral lens element 1615 may be implemented as any one of a plano-convex lens, a biconvex lens, or a meniscus lens (e.g., converging, diverging, or having substantially zero total effective optical power).

In one or more embodiments, spectral lens element 1615 may be implemented as a meniscus lens. Such meniscus lens may include a first surface closest to objective lens element 1605 (e.g., the objective surface of spectral lens element 1615) and a second surface closest to detector 6132, 6142 (e.g., the subjective surface of spectral lens element 1615) opposite the first surface. The first surface may be flat, convex, or concave, and the second surface may be convex. In certain embodiments, the first surface is concave and the second surface is convex.

As shown in FIG. 16, spectral lens element 1615 may include one or more interference filters 1616 on one or both surfaces of spectral lens element 1615. Each interference filter 1616 may be configured to filter different spectral regions of IR radiation 1601, such as according to different gases. For example, each interference filter 1616 may be adapted to pass an absorption, emission, and/or transmission spectrum (e.g., high absorption wavelength band A or low absorption wavelength band B) of a gas to be detected while filtering at least a portion of other detectable spectrums, for example, and individually or in combination operate as a high, low, or band pass filter.

In certain embodiments, interference filter 1616 includes a short wavelength pass (SP) interference filter and/or a long wavelength pass (LP) interference filter. In embodiments where both an SP interference filter and an LP interference filter are present, the SP interference filter may be applied onto one surface of spectral lens element 1615 and the LP interference filter may be applied onto the opposite or other surface of spectral lens element 1615. In various embodiments, the wavelength band allowed to pass through the SP interference filter at least partially overlaps the wavelength band allowed to pass through the LP interference filter. By using both an SP interference filter and an LP interference filter, spectral lens element 1615 can be configured to effectively isolate a band of wavelengths from the IR spectrum.

In one or more embodiments, the LP interference filter is provided on the first or objective surface of spectral lens element 1615 closest to the scene. In certain embodiments, the LP interference filter blocks the medium wavelength IR (MWIR) region so that less than 1% of the MWIR region passes through spectral lens element 1615. In general, an antireflective coating is not required on spectral lens element 1615

In various embodiments, the SP interference filter may be implemented as a high efficiency (HE) SP interference filter and/or the LP interference filter may be implemented as an HE LP interference filter. Each HE interference filter typically allows a transmittance of greater than 95% for efficient gas signal transmittance. In certain embodiments, the SP interference filter and the LP interference filter are configured to combine to pass wavelengths between 7-12 µm.

In general, interference filters 1616 may be implemented by one or more coatings, such as typically thin-film coatings that can be applied to one or both surfaces of spectral lens element 1615. Such coatings can be configured to function at relatively high efficiency/transmittance (e.g., in their pass band), as compared to more durable coatings, because the interference filters 1616 are generally mounted inside a housing and thus protected from the environment and scratches. Typically, interference filters 1616 are thicker than durable coatings, but interference filters 1616 are often softer and more easily damaged.

There is generally no limit to the thickness of the interference filters/coatings 1616 that may be applied to spectral lens element 1615, and the thickness depends on the materials and the manufacturing process used. One advantage of placing an SP coating on one surface of spectral lens element 1615 and an LP coating on the opposing surface is that tensions caused by thermal expansion/contraction of the coatings tend to balance out each other and minimize the risk of warping spectral lens element 1615 and causing detrimental optical effects and/or wrinkling, delaminating, or otherwise damaging interference filters 1616. Appropriate coating materials and/or thicknesses may be selected according to the desired wavelength band to be passed through spectral lens element 1615 and/or optical system 6131, 6141 and detected by detector 6132, 6142.

In some embodiments, spectral lens element 1615 is fixed within optical system 6131, 6141, and in other embodiments, spectral lens element 1615 is configured to be removable from optical system 6131, 6141 such that a different spectral lens element 1615 with different interference filters 1616 may be incorporated within optical system 6131, 6141 for different wavelength band selections. By simply exchanging spectral lens element 1615 (e.g., and/or one or more other elements of optical system 6131, 6141), thermal imaging device 170 can be switched from, for example, $CH_4$ detection to $SF_6$ detection. Moreover, by narrowing the spectral region passed by spectral lens element 1615, higher optical performance with respect to gas imaging (e.g., gas contrast) can be achieved.

Because interference filters 1616 are incorporated onto spectral lens elements 1615, a separate filter element is not needed in optical system 6131, 6141, thereby reducing the number of components, cost, and complexity of optical system 6131, 6141. The working distance between spectral lens element 1615 and detector 6132, 6142 can also be relatively small, which makes it easier for embodiments to achieve a low F-number. Moreover, reducing the total number of optical elements of optical system 6131, 6141 reduces the overall length of optical system 6131, 6141 (e.g., along IR radiation 1601 from an imaged scene to detector 6132, 6142), which also helps embodiments of optical system 6131, 6141 achieve a relatively low overall or effective F-number characteristic of optical system 6131, 6141. Generally, the F-number or effective F-number is associated with the lens/optical system focal length divided by the diameter of the lens/optical system entrance pupil (the opening allowing light to reach detector 6132, 6142), and so a relatively low F-number increases the amount of IR radiation 1601 reaching detector 6132, 6142, which increases overall optical performance (e.g., increased frame rate with less blurring of image detail, and/or other related optical performance characteristics).

In one or more embodiments, either one of interference filters 1616 may be interchangeable with one or more antireflective coatings (e.g., HEAR coatings). For example, in some embodiments, one surface of spectral lens element 1615 may be coated with an interference filter, and the other surface may be coated with a HEAR coating. In a particular embodiment, an SP interference filter may be disposed on an objective surface of spectral lens element 1615 and a HEAR coating may be disposed on a subjective surface of spectral lens element 1615. In such embodiment, an LP interference filter may be disposed on a separate optical element of optical system 6131, 6141, for example, such as on an objective or subjective surface of protective window 1625.

In some embodiments, optical system 6131, 6141 may include a third lens element 1620, which may be referred to as the subjective lens element 1620. Similar to objective lens element 1605, one or more coatings 1621, such as an antireflective coating (e.g., a HEAR coating), may be applied to one or both surfaces of subjective lens element 1620. In such embodiments, subjective lens 1620 may be configured to converge filtered IR radiation 1617 provided by spectral lens element 1615 and form an image of the scene on detector 6132, 6142. More generally, optical system 6131, 6141 may include any number of additional lens elements configured to work in conjunction with objective lens 1605 and spectral lens element 1615 to form an image of the scene on detector 6132, 6142. However, in some embodiments, optical system 6131, 6141 may be implemented with objective lens 1605 and spectral lens element 1615 as the only constituent lens elements, where spectral lens element 1615 is shaped to converge IR radiation 1601 provided by objective lens element 1605 and form an image of the scene on detector 6132, 6142.

In various embodiments, a protective window 1625 for detector 6132, 6142 may be provided in optical system 6131, 6141 and may be disposed immediately in front of detector 6132, 6142 (e.g., between subjective lens element 1620 and detector 6132, 6142). Protective window 1625 may be implemented as an optical flat (e.g., a transmissive planar optical element that is neither converging or diverging and has zero optical power) and can advantageously prevent particles (e.g., dust) from reaching detector 6132, 6142 and causing interference in capturing images of a scene and/or potentially damaging electronic components of thermal imaging device 170. Protective window 1625 may be made of a material that has a high efficiency of transmitting IR radiation generally and/or within a selectable wavelength band. In some embodiments, protective window 1625 provides a physical seal against moisture and/or dust for detector 6132, 6142, for example, and may be integrated with detector 6132, 6142 so as to provide a vacuum seal for detector 6132, 6142.

In some embodiments, one or more coatings 1626, such as an antireflective coating or interference filter, may be applied to one or both surfaces of protective window 1625 to improve transmission of IR radiation and/or to further narrow the IR radiation 1617 to a desired wavelength band. According to one or more embodiments, coatings 1626 may be configured to reduce reflection of IR radiation within a particular wavelength band of interest. In a particular embodiment, spectral lens element 1615 may include one of an SP or LP interference filter, and protective window 1625 may include the other of the SP or LP interference filter, such that combination of interference filters passes a selected band of wavelengths or spectral region to detector 6132, 6142.

Generally, each element of optical system 6131, 6141 may be manufactured separately, for example, and assembled into optical system 6131, 6141. In alternative embodiments, one or more elements of optical system 6131, 6141 may be fabricated along with fabrication of detector 6132, 6142, such as through various combined deposition and/or fabrication techniques that occur generally at high vacuum and/or typically under the same environmental conditions associated with integrated circuit fabrication.

Figure 17:
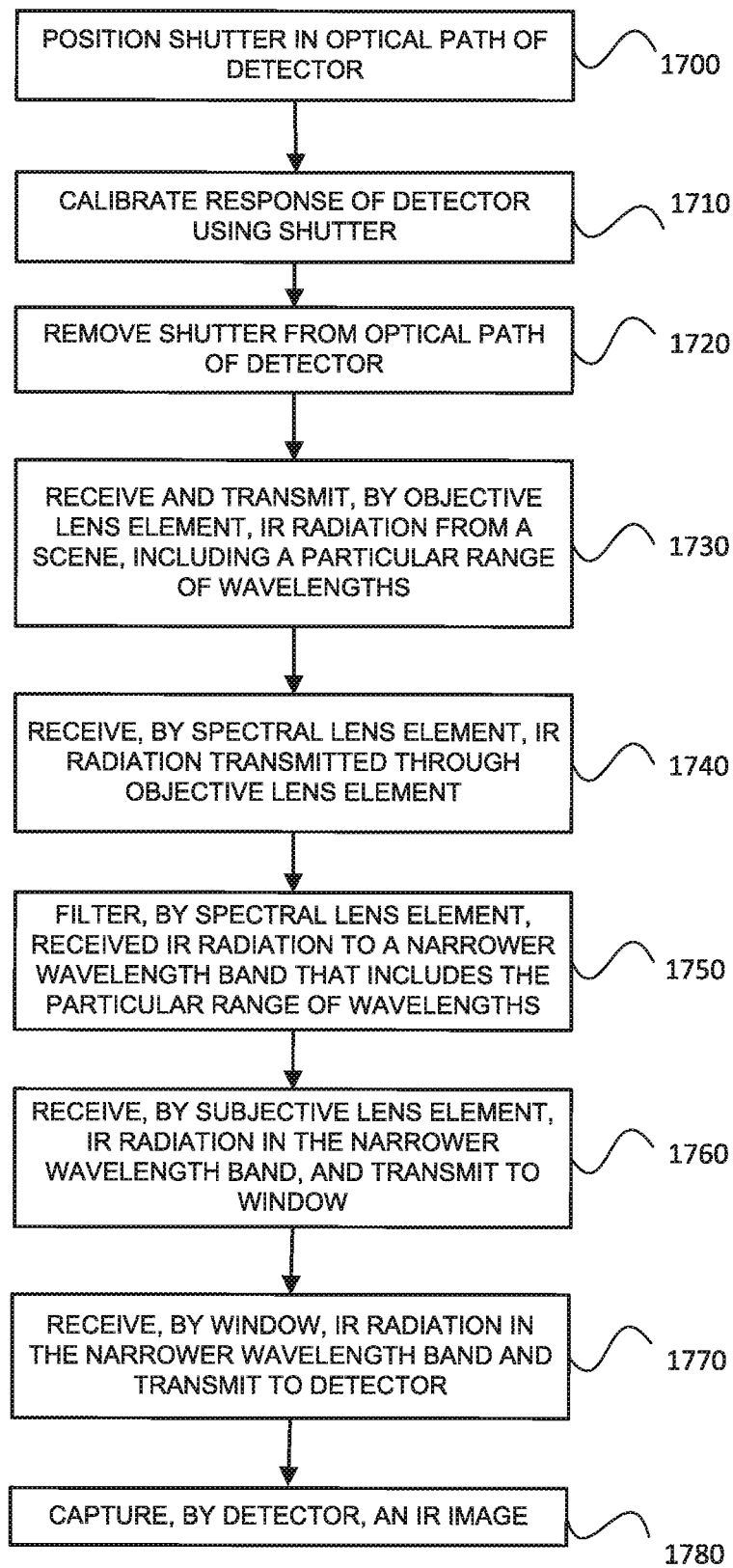
FIG. 17 illustrates a process of operating an optical system, in accordance with one or more embodiments of the disclosure.

FIG. 17 illustrates a process of operating optical system 6131, 6141 in combination with detector 6132, 6142 in accordance with an embodiment of the disclosure. In step 1700, shutter 1610 is positioned in the optical path of detector 6132, 6142. In step 1710, closed shutter 1610 is used to calibrate the response of detector 6132, 6142 to make the detector 6132, 6142 a radiometric thermal imager. In step 1720, shutter 1610 is removed from the optical path of detector 6132, 6142. In step 1730, objective lens element 1605 receives and transmits IR radiation 1601 from a scene, including a particular range of wavelengths corresponding to an absorption/emission spectrum or transmission spectrum of a gas. In step 1740, spectral lens element 1615 receives the IR radiation 1601 transmitted by objective lens element 1605.

In step 1750, spectral lens element 1615 filters the IR radiation 1601 received from objective lens element 1605 to a narrower wavelength band 1617 that includes the particular range of wavelengths. For example, such narrower wavelength band may correspond to the effect of an LP interference filter (e.g., a first narrower wavelength band), an SP interference filter (e.g., a second narrower wavelength band), or a combination of LP and SP interference filters (e.g., a combination of the first and second narrower wavelength bands, such as an overlapping band pass of IR wavelengths). In various embodiments, spectral lens element 1615 may include at least one interference filter 1616 configured to filter the received IR radiation over a range of wavelengths corresponding to an absorption/emission spectrum or transmission spectrum of a gas. In related embodiments, interference filters 1616 may include an SP interference filter and/or an LP interference filter.

In step 1760, subjective lens element 1620 receives the filtered IR radiation in the narrower wavelength band 1617 and transmits this IR radiation 1617 to protective window 1625. In step 1770, window 1725 receives the IR radiation in the narrower wavelength band 1617 and transmits this narrower band IR radiation 1617 to detector 6132, 6142. In various embodiments, protective window 1625 includes a coating 1626 that may be implemented as an interference filter. Interference filter 1626 may further filter the IR radiation in the narrower wavelength band to an even narrower wavelength band. In step 1780, detector 6132, 6142 receives the IR radiation in the narrower wavelength band 1617 and captures an IR image (e.g., a gas IR image or a background IR image) of the scene. The IR image may then be used to generate a gas-absorption-path-length image of the scene, as described above.

Figure 18:
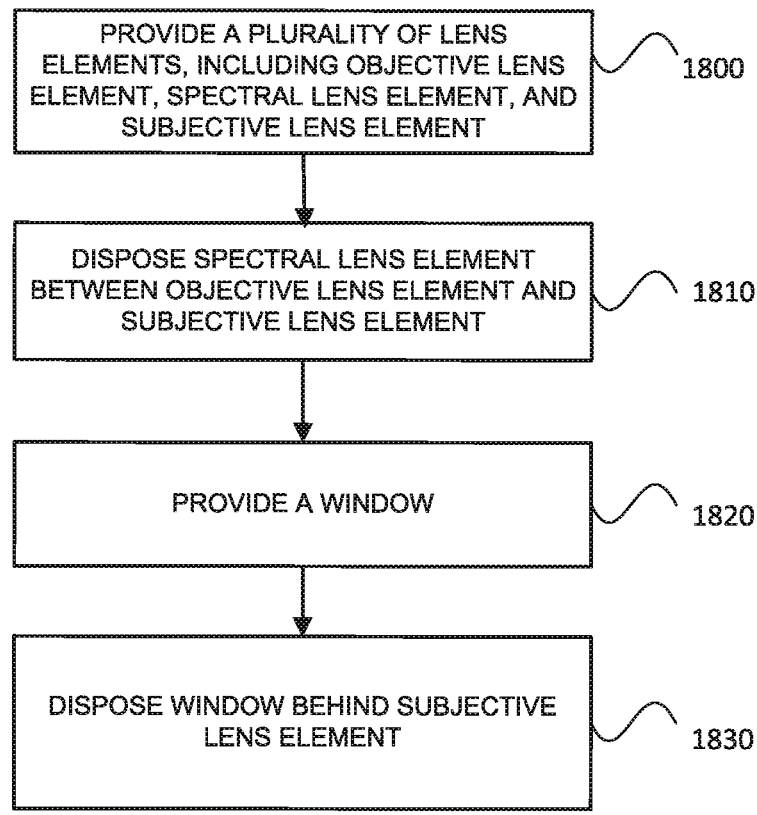
FIG. 18 illustrates a process of manufacturing an optical system, in accordance with one or more embodiments of the disclosure.

FIG. 18 illustrates a process of manufacturing optical system 6131, 6141 in accordance with an embodiment of the disclosure. In step 1800, a plurality of lens elements, including objective lens element 1615, spectral lens element 1615, and subjective lens element 1620, are provided. The spectral lens element 1615 may include one or more interference filters 1616, which may be configured to filter a particular range of wavelengths. Objective lens element 1605 and/or subjective lens element 1620 may include various coatings, including various types of antireflective coatings and/or durable coatings. In step 1810, spectral lens element 1615 is disposed or placed between objective lens element 1605 and subjective lens element 1620. In various embodiments, spectral lens element 1615 may be positioned between objective lens element 1605 and detector 6132, 6142, for example, or between shutter 1610 and protective window 1625. Shutter 1610 may be positioned between objective lens element 1605 and spectral lens element 1615, for example, or in alternative embodiments, between objective lens element 1605 and an imaged scene. In step 1820, a protective window 1625 is provided. In some embodiments, protective window 1625 may include coating 1626, which may be an antireflective coating, for example, or an interference filter selected to have at least a partially overlapping band with an interference filter formed on spectral lens element 1615. In step 1830, protective window 1625 is disposed or placed behind subjective lens element 1620 (e.g., between subjective lens element 1620 and detector 6132, 6142). Optical system 6131, 6141, including objective lens element 1615, spectral lens element 1615, subjective lens element 1620, shutter 1610, and/or protective window 1625, may then be mounted or arranged in front of detector 6132, 6142.

Figure 19:
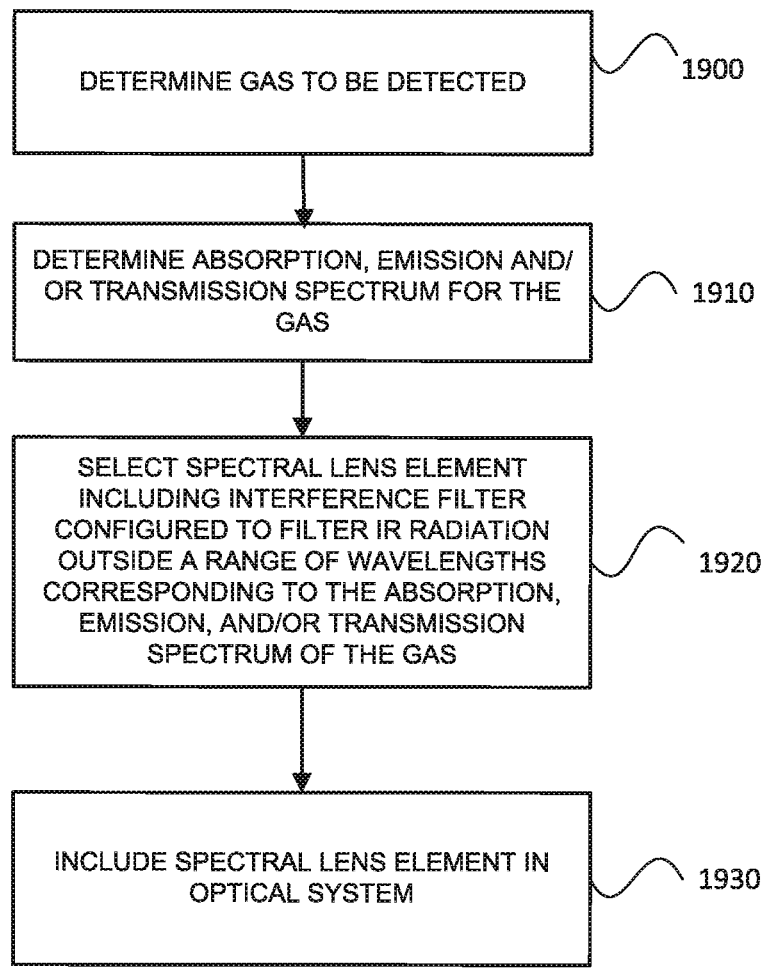
FIG. 19 illustrates a process of configuring an optical system for detection of a particular gas, in accordance with one or more embodiments of the disclosure.

FIG. 19 illustrates a process of configuring optical system 6131, 6141 for detection of a particular gas, in accordance with an embodiment of the disclosure. In step 1900, a gas to be detected is determined. For example, in some embodiments, the gas to be detected may be selected as $CH_4$ or $SF_6$. In step 1910, an absorption/emission spectrum and/or transmission spectrum of the gas is determined. For example, a high absorption wavelength band A and/or a low absorption wavelength band B may be determined as described above. In step 1920, spectral lens element 1615, including one or more interference filters 1616 configured to filter IR radiation outside a range of wavelengths corresponding to the absorption/emission spectrum and/or transmission spectrum of the gas (e.g., configured to transmit or pass such range of wavelengths), is selected for inclusion into optical system 6131, 6141. In various embodiments, interference filters 1616 may include an SP interference filter and/or an LP interference filter, for example, with overlapping pass bands corresponding to such range of wavelengths. In step 1930, spectral lens element 1615 is included in/incorporated into optical system 6131, 6141.

In one or more embodiments, there is provided a computer-readable medium on which is stored (1) non-transitory information for performing a method according to any of the embodiments described herein, and/or (2) non-transitory information configured to control a processor/processing unit to perform any of the steps or functions of embodiments described herein.

In one or more embodiments, there is provided a computer program product comprising code portions adapted to control a processor to perform any of the steps or functions of any of the embodiments described herein. Software in accordance with the present disclosure, such as program code portions and/or data, can be stored in non-transitory form on one or more machine-readable mediums. It is also contemplated that software identified herein can be implemented using one or more general purpose or specific purpose computers and/or computer systems, networked and/or otherwise.

Where applicable, one or more embodiments provided by the present disclosure can be implemented using hardware, software, or combinations of hardware and software. Also where applicable, the various hardware components and/or software components set forth herein can be combined into composite components comprising software, hardware, and/or both. Where applicable, the various hardware components and/or software components set forth herein can be separated into sub-components comprising software, hardware, or both. In addition, where applicable, it is contemplated that software components can be implemented as hardware components, and vice-versa. Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. A device, comprising:
a three-lens optical system comprising:
an objective lens element configured to receive and transmit infrared (IR) radiation from a scene, wherein the IR radiation from the scene includes a particular range of wavelengths corresponding to an absorption/emission spectrum or a transmission spectrum of a gas;
a subjective lens element; and
a spectral lens element disposed between the objective lens element and the subjective lens element, wherein the spectral lens element is configured to receive the IR radiation transmitted through the objective lens element, wherein the spectral lens element comprises:
a first interference filter disposed on a first surface of the spectral lens element that is configured to filter the IR radiation transmitted through the objective lens element to a narrower wavelength band that includes the particular range of wavelengths, and
a second interference filter on a second surface opposite the first surface that is configured to filter the IR radiation transmitted through the objective lens element to a second narrower wavelength band that includes the particular range of wavelengths.

2. The device of claim 1, further comprising:
a detector configured to capture an IR image of the scene based on the IR radiation in the narrower wavelength band, wherein the subjective lens element is disposed between the spectral lens element and the detector.

3. The device of claim 2, further comprising:
a memory; and
a processor communicatively coupled to the memory and the optical system, the processor configured to generate a gas-absorption-path-length-image of the scene based on the IR image captured by the detector.

4. The device of claim 1, wherein:
the objective lens comprises a meniscus lens comprising a concave surface oriented towards the spectral lens element and a convex surface opposite the concave surface;
the spectral lens element comprises a meniscus lens comprising a concave surface oriented towards the objective lens element and a convex surface opposite the concave surface; and
the subjective lens comprises a meniscus lens comprising a concave surface oriented towards the spectral lens element and a convex surface opposite the concave surface and oriented towards a detector of the device.

5. The device of claim 2, further comprising:
a shutter disposed between the objective lens element and the spectral lens element that is configured to be selectively positioned to block the IR radiation from the scene from reaching the detector; and
a protective window disposed between the subjective lens element and the detector.

6. The device of claim 2,
wherein the subjective lens element is disposed between the spectral lens element and the detector, wherein the subjective lens element and/or the objective lens element comprise an antireflective coating.

7. The device of claim 1, wherein:
the first interference filter comprises a long wavelength pass (LP) interference filter; and
the second interference filter comprises a short wavelength pass (SP) interference filter.

8. The device of claim 1, wherein:
a combination of the first and second narrower wavelength bands corresponds to a high absorption wavelength band A or a low absorption wavelength B of the gas.

9. A method of operating the device of claim 1, the method comprising:
providing the IR radiation in the narrower wavelength band to a detector of the device;
capturing, by the detector, an IR image of the scene based on the IR radiation in the narrower wavelength band;
processing, by a processor, image data corresponding to the captured IR image and provided by the detector; and
displaying a gas-absorption-path-length image of the scene based on the processed image data.

10. The method of claim 9, wherein:
the IR image of the scene comprises a gas IR image or a background IR image.

11. A method, comprising:
transmitting, by an objective lens element of a three-lens optical system for a device, infrared (IR) radiation from a scene, wherein the IR radiation from the scene includes a particular range of wavelengths corresponding to an absorption/emission spectrum or transmission spectrum of a gas; and receiving, by a spectral lens element of the optical system, the IR radiation transmitted through the objective lens element, wherein receiving the IR radiation comprises:
filtering, by a first interference filter disposed on a first surface of the spectral lens element, the IR radiation to a narrower wavelength band that includes the particular range of wavelengths, and
filtering, by a second interference filter disposed on a second surface opposite the first surface, the IR radiation transmitted through the objective lens element to a second narrower wavelength band that includes the particular range of wavelengths; and
receiving, by a subjective lens element of the optical system, the filtered IR radiation, wherein the spectral lens element is disposed between the objective lens element and a subjective lens element.

12. The method of claim 11, wherein:
the optical system further comprises a shutter and the device further comprises a detector; and
the method further comprises selectively positioning the shutter in front of the detector to block the IR radiation from the scene from reaching the detector.

13. The method of claim 11, wherein:
the first interference filter comprises an LP interference filter disposed on an objective surface of the spectral lens element;
the spectral lens element comprises an SP interference filter disposed on a subjective surface of the spectral lens element;
the optical system further comprises a protective window disposed between the subjective lens element and a detector of the device;
and
the method further comprises filtering, by the second interference filter, IR radiation transmitted through the first interference filter.

14. The method of claim 11, further comprising:
capturing, by a detector of the device, an IR image of the scene based on the IR radiation in the narrower wavelength band;
processing, by a processor, image data corresponding to the IR image of the scene captured by the detector; and
displaying a gas-absorption-path-length image of the scene based on the processed image data.

15. The device of claim 1, wherein the first and second interference filters in combination filter the IR radiation to a selectable long wave infrared wavelength band comprising the particular range of wavelength.

16. The device of claim 15, wherein the selectable long wavelength band is within a wavelength range of 7-12 µm.

17. The device of claim 1, wherein the spectral lens element comprises an exchangeable spectral lens element having a plano-convex lens comprising a convex surface oriented toward the subjective lens element.

18. The method of claim 11, wherein the first and second interference filters in combination filter the IR radiation to a selectable long wave infrared wavelength band comprising the particular range of wavelength.

19. The method of claim 18, wherein the selectable long wave infrared band is within a wavelength range of 7-12 µm.

20. The method of claim 11, wherein:
the spectral lens element is a first spectral lens element;
the method further comprises exchanging the first spectral lens element with a second spectral lens element;

the second spectral lens element comprises a third interference filter disposed on a first surface of the second spectral lens element and a fourth interference filter on a second surface of the second spectral lens element; and the third and fourth interference filters are different from the first and second interference filters.

\* \* \* \* \*

UNITED STATES PATENT AND TRADEMARK OFFICE
CERTIFICATE OF CORRECTION

| | |
|---|---|
| PATENT NO. | : 12,105,020 B2 |
| APPLICATION NO. | : 17/351126 |
| DATED | : October 1, 2024 |
| INVENTOR(S) | : Jonas Sandsten and Sten Lindau |

Page 1 of 1

It is certified that error appears in the above-identified patent and that said Letters Patent is hereby corrected as shown below:

In the Specification

In the CROSS REFERENCE TO RELATED APPLICATIONS:
Column 1, Lines 16-17, change "U.S. patent application Ser. No." to --U.S. Patent Application No.--.

Column 1, Line 21, change "U.S. patent application Ser. No." to --U.S. Patent Application No.--.

In the DETAILED DESCRIPTION:
Column 22, Line 51, change "values 1430, $A_{M,N}$ and $B_{M,N}$" to --values $A_{M,N}$ and $B_{M,N}$--.

Column 23, Lines 14-15, change "pixel values 1430, $A_{M,N}$ and $B_{M,N}$ respectively." to --pixel values 1430, $A_{M,N}$ and $B_{M,N}$ respectively--.

Signed and Sealed this
Seventeenth Day of December, 2024

Derrick Brent
*Acting Director of the United States Patent and Trademark Office*